(12) United States Patent
Jia

(10) Patent No.: US 12,004,083 B2
(45) Date of Patent: *Jun. 4, 2024

(54) MANAGING NEGOTIATION OF POWER SAVING MODE PARAMETERS BETWEEN A USER EQUIPMENT AND A CORE NETWORK DEVICE

(71) Applicant: AT&T Mobility II LLC, Atlanta, GA (US)

(72) Inventor: Yupeng Jia, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/662,276

(22) Filed: May 6, 2022

(65) Prior Publication Data

US 2022/0264465 A1 Aug. 18, 2022

Related U.S. Application Data

(63) Continuation of application No. 16/843,949, filed on Apr. 9, 2020, now Pat. No. 11,356,952, which is a
(Continued)

(51) Int. Cl.
*G08C 17/00* (2006.01)
*H04W 52/02* (2009.01)
(Continued)

(52) U.S. Cl.
CPC ... *H04W 52/0235* (2013.01); *H04W 52/0203* (2013.01); *H04W 4/70* (2018.02); *H04W 88/02* (2013.01); *Y02D 30/70* (2020.08)

(58) Field of Classification Search
CPC . H04W 52/02; H04W 52/0216; H04W 84/12; H04W 52/0229; H04W 84/18;
(Continued)

(56) References Cited

U.S. PATENT DOCUMENTS 5,572,674 A * 11/1996 Ernst ................... H04L 43/00
709/221
7,672,660 B2 3/2010 Kim et al.
(Continued)

FOREIGN PATENT DOCUMENTS

CN 101111051 A 1/2008
CN 102761944 B 12/2014
(Continued)

OTHER PUBLICATIONS

Non-Final Office Action received for U.S. Appl. No. 16/850,073 dated Oct. 5, 2021, 50 pages.
(Continued)

*Primary Examiner* — Phuongchau Ba Nguyen

(57) ABSTRACT

The disclosed subject matter provides techniques for managing negotiation of power saving mode (PSM) parameters between a user equipment (UE) and core network device of a wireless communication network. In this regard, a method is provided that includes facilitating establishing, by a device comprising a processor, a wireless communication link with a network device of a wireless network. The method can further include, based on a determination that a power saving mode retry protocol for the device is enabled, determining, by the device, a number of times the network device previously instructed the device to use network values for power saving mode timers instead of device values for the power saving mode timers in association with the device operating in a power saving mode.

20 Claims, 11 Drawing Sheets

Related U.S. Application Data continuation of application No. 16/251,334, filed on Jan. 18, 2019, now Pat. No. 10,652,825, which is a continuation of application No. 15/363,532, filed on Nov. 29, 2016, now Pat. No. 10,225,802.

(51) Int. Cl.
*H04W 4/70* (2018.01)
*H04W 88/02* (2009.01)

(58) Field of Classification Search
CPC ......... H04W 52/0235; H04W 52/0203; H04W 4/70; H04W 88/02; Y02D 30/70
See application file for complete search history.

(56) References Cited

U.S. PATENT DOCUMENTS

| | | | |
|---|---|---|---|
| 7,760,676 | B2 | 7/2010 | Demirhan et al. |
| 7,801,066 | B2 | 9/2010 | Wang et al. |
| 7,899,003 | B2 | 3/2011 | Xu |
| 7,899,433 | B2 | 3/2011 | Lee et al. |
| 7,957,360 | B2 | 6/2011 | Suzuki et al. |
| 7,991,436 | B2 | 8/2011 | Yanover |
| 8,086,213 | B1 | 12/2011 | Wong et al. |
| 8,260,374 | B2 | 9/2012 | Wang et al. |
| 8,265,017 | B2 | 9/2012 | Robinson et al. |
| 8,265,682 | B2 | 9/2012 | Bertrand et al. |
| 8,284,707 | B2 | 10/2012 | Choi et al. |
| 8,289,891 | B2 | 10/2012 | Ji et al. |
| 8,538,432 | B2 | 9/2013 | Lee et al. |
| 8,577,326 | B2 | 11/2013 | Bhattacharya |
| 8,599,730 | B2 | 12/2013 | Cheng et al. |
| 8,718,029 | B1 | 5/2014 | Wong et al. |
| 8,929,812 | B2 | 1/2015 | Gree |
| 8,971,933 | B2 | 3/2015 | Kitazoe et al. |
| 9,100,873 | B2 | 8/2015 | Luna et al. |
| 9,167,617 | B2 | 10/2015 | Davies et al. |
| 9,179,410 | B2 | 11/2015 | Frye |
| 9,226,335 | B1 | 12/2015 | Semersky et al. |
| 9,237,478 | B2 | 1/2016 | Vannithamby et al. |
| 9,307,439 | B2 | 4/2016 | Shaw et al. |
| 9,326,235 | B1 | 4/2016 | Wong et al. |
| 9,609,598 | B2 * | 3/2017 | Sivanadyan ........ H04L 1/1812 |
| 10,225,802 | B2 | 3/2019 | Jia |
| 10,231,281 | B2 | 3/2019 | Jia |
| 10,652,825 | B2 * | 5/2020 | Jia ............. H04W 52/0235 |
| 10,667,325 | B2 * | 5/2020 | Jia ............. H04W 52/0216 |
| 10,681,512 | B2 | 6/2020 | Ahluwalia et al. |
| 11,356,952 | B2 * | 6/2022 | Jia ............. H04W 52/0235 |
| 2007/0167195 | A1 | 7/2007 | Su et al. |
| 2008/0082866 | A1* | 4/2008 | Li ................ G06F 11/221 |
| | | | 714/E11.161 |
| 2009/0154386 | A1 | 6/2009 | So et al. |
| 2009/0180451 | A1 | 7/2009 | Alpert et al. |
| 2009/0196256 | A1 | 8/2009 | Digirolamo et al. |
| 2010/0029331 | A1 | 2/2010 | Gnuschke |
| 2010/0323647 | A1 | 12/2010 | Ryu et al. |
| 2013/0132652 | A1* | 5/2013 | Wood ............. G11C 29/42 |
| | | | 711/103 |
| 2013/0279375 | A1 | 10/2013 | Newberg et al. |
| 2013/0294230 | A1 | 11/2013 | Popa et al. |
| 2013/0294307 | A1 | 11/2013 | Johansson et al. |
| 2014/0018085 | A1 | 1/2014 | Young et al. |
| 2014/0129672 | A1 | 5/2014 | Singh |
| 2014/0211676 | A1 | 7/2014 | Chhabra |
| 2014/0301373 | A1 | 10/2014 | Cili et al. |
| 2015/0029920 | A1 | 1/2015 | Hoehne et al. |
| 2016/0192435 | A1 | 6/2016 | Gupta et al. |
| 2016/0211986 | A1 | 7/2016 | Diachina et al. |
| 2016/0295504 | A1 | 10/2016 | Wang et al. |
| 2016/0381639 | A1* | 12/2016 | Kim ............. H04W 76/18 |
| | | | 370/311 |
| 2018/0152890 | A1 | 5/2018 | Jia |
| 2018/0152978 | A1 | 5/2018 | Jia |
| 2018/0295612 | A1 | 10/2018 | Yi |
| 2020/0236627 | A1 | 7/2020 | Jia |
| 2020/0245397 | A1 | 7/2020 | Jia |
| 2020/0280917 | A1* | 9/2020 | Hua ............. H04W 76/28 |

FOREIGN PATENT DOCUMENTS

| | | |
|---|---|---|
| JP | 2003-179539 A | 6/2003 |
| WO | 2005/064818 A1 | 7/2005 |
| WO | 2006/071096 A1 | 7/2006 |
| WO | 2014/042377 A1 | 3/2014 |

OTHER PUBLICATIONS

Seok et al., "Application-Driven Network Capacity Adaptation for Energy Efficient Ad-Hoc Networks", http://citeseerx.ist.psu.edu/viewdoc/download?doi=10.1.1.217.5872&rep=rep1&type=pdf, 14th IEEE 2003 International Symposium on Personal, Indoor and Mobile Radio Communications, PIMRC 2003, Proceedings on vol. 1, 2003, pp. 211-215. Retrieved on Sep. 19, 2016.

Kumar et al., "Medium Access Control protocols for ad hoc wireless networks: a survey", http://www2.ece.gatech.edu/research/labs/bwn/ee6610/supplements/adhocmac.pdf, Ad Hoc Networks 4.3, 2004, pp. 1-33. Retrieved on Sep. 19, 2016.

Hur et al., "A Hierarchical Power-saving Method of WUSB over WBAN", http://citeseerx.ist.psu.edu/viewdoc/download?, International Journal of Multimedia and Ubiquitous Engineering, vol. 8, No. 3, 2013, pp. 67-82. Retrieved on Sep. 19, 2016, 16 pages.

Han et al., "Design, Realization, and Evaluation of DozyAP for Power-Efficient Wi-Fi Tethering", http://www.cs.wm.edu/~liqun/paper/ton14dozyap.pdf, IEEE/ACM Transactions on Networking (TON), vol. 22, No. 5, 2014, pp. 1672-1685. Retrieved on Sep. 19, 2016, 14 pages.

Kuo et al., "Power Saving Scheduling Scheme for Internet of Things over LTE/LTE-Advanced Networks", Hindawi Publishing Corporation Mobile Information Systems vol. 2015, Article ID 971538, 12 pages. Received Oct. 1, 2015.

Khan, Waqas, Ahmad., "Impact of DRX on VoIP Performance and Battery Life in LTE", http://www.divaportal.org/smash/get/diva2:828296/FULLTEXT01.pdf, 2009, 63 pages. Retrieved on Sep. 19, 2016.

Fowler et al., "Analysis of Adjustable and Fixed DRX Mechanism for Power Saving in LTE/LTE-Advanced", http://www.divaportal.org/smash/get/diva2:575836/FULLTEXT01.pdf, IEEE International Conference on Communications (ICC), IEEE, 2012, 7 pages. Retrieved on Sep. 19, 2016.

Shin et al., "Energy-Delay Tradeoff Analysis and Enhancement in LTE Power-Saving Mechanisms", http://sons.hknu.ac.kr/doc/ICCE_LTE_PSM.pdf, International Conference on Consumer Electronics (ICCE). IEEE, 2013, 2 pages. Retrieved on Sep. 19, 2016.

Fowler et al., "Analytical evaluation of extended DRX with additional active cycles for light traffic", http://www.divaportal.org/smash/get/diva2:788911/FULLTEXT02, Computer Network, vol. 77, 2015, 21 pages. Retrieved on Sep. 19, 2016, 21 pages.

Non-Final Office Action received for U.S. Appl. No. 15/363,661 dated May 16, 2018, 42 pages.

Non-Final Office Action received for U.S. Appl. No. 15/363,532 dated May 15, 2018, 28 pages.

Stea et al., "A comprehensive simulation analysis of LTE Discontinuous Reception (DRX)", http://dx.doi.org/10.1016/j.comnet.2014.07.014, Computer Networks, vol. 1, 2014, 19 pages.

U.S. Appl. No. 15/363,532 dated Nov. 29, 2016, Claims 1-20, pp. 41-45.

U.S. Appl. No. 15/363,661 dated Nov. 29, 2016, Claims 1-20, pp. 38-42.

Non-Final Office Action received for U.S. Appl. No. 16/254,745 dated Sep. 6, 2019, 58 pages.

Non-Final Office Action received for U.S. Appl. No. 16/251,334 dated Sep. 6, 2019, 58 pages.

Non-Final Office Action received for U.S. Appl. No. 16/843,949 dated Oct. 7, 2021, 58 pages.

(56) References Cited

OTHER PUBLICATIONS

Notice of Allowance received for U.S. Appl. No. 16/850,073 dated Feb. 10, 2022, 45 pages.
Notice of Allowance received for U.S. Appl. No. 16/843,949 dated Feb. 9, 2022, 41 pages.
U.S. Appl. No. 16/843,949, filed Apr. 9, 2020.
U.S. Appl. No. 16/251,334, filed Jan. 18, 2019.
U.S. Appl. No. 15/363,532, filed Nov. 29, 2016.

* cited by examiner

MANAGING NEGOTIATION OF POWER SAVING MODE PARAMETERS BETWEEN A USER EQUIPMENT AND A CORE NETWORK DEVICE

RELATED APPLICATIONS

The subject patent application is a continuation of, and claims priority to each of, U.S. patent application Ser. No. 16/843,949, filed Apr. 9, 2020, and entitled "MANAGING NEGOTIATION OF POWER SAVING MODE PARAMETERS BETWEEN A USER EQUIPMENT AND A CORE NETWORK DEVICE," which is a continuation of U.S. patent application Ser. No. 16/251,334 (now U.S. Pat. No. 10,652,825), filed Jan. 18, 2019, and entitled "MANAGING NEGOTIATION OF POWER SAVING MODE PARAMETERS BETWEEN A USER EQUIPMENT AND A CORE NETWORK DEVICE," which is a continuation of U.S. patent application Ser. No. 15/363,532 (now U.S. Pat. No. 10,225,802), filed Nov. 29, 2016, and entitled "MANAGING NEGOTIATION OF POWER SAVING MODE PARAMETERS BETWEEN A USER EQUIPMENT AND A CORE NETWORK DEVICE," the entireties of which priority applications are hereby incorporated by reference herein.

TECHNICAL FIELD

The disclosed subject matter relates to techniques for managing negotiation of power saving mode (PSM) parameters between a user equipment (UE) and a core network device.

BACKGROUND

Under the umbrella of third generation partnership project (3GPP) wireless communication technology standards, radio-access technologies for mobile broadband have evolved effectively to provide connectivity to billions of subscribers and devices. Within this ecosystem, the standardization of a radio technology for massive machine-type communication (MTC) applications is also evolving. A yet unfulfilled aim is for this technology to provide cost-effective connectivity to billions of "Internet of things" (IoT) devices, to support low power consumption and the use of low-cost devices, and to provide excellent coverage.

DETAILED DESCRIPTION

Figure 1:
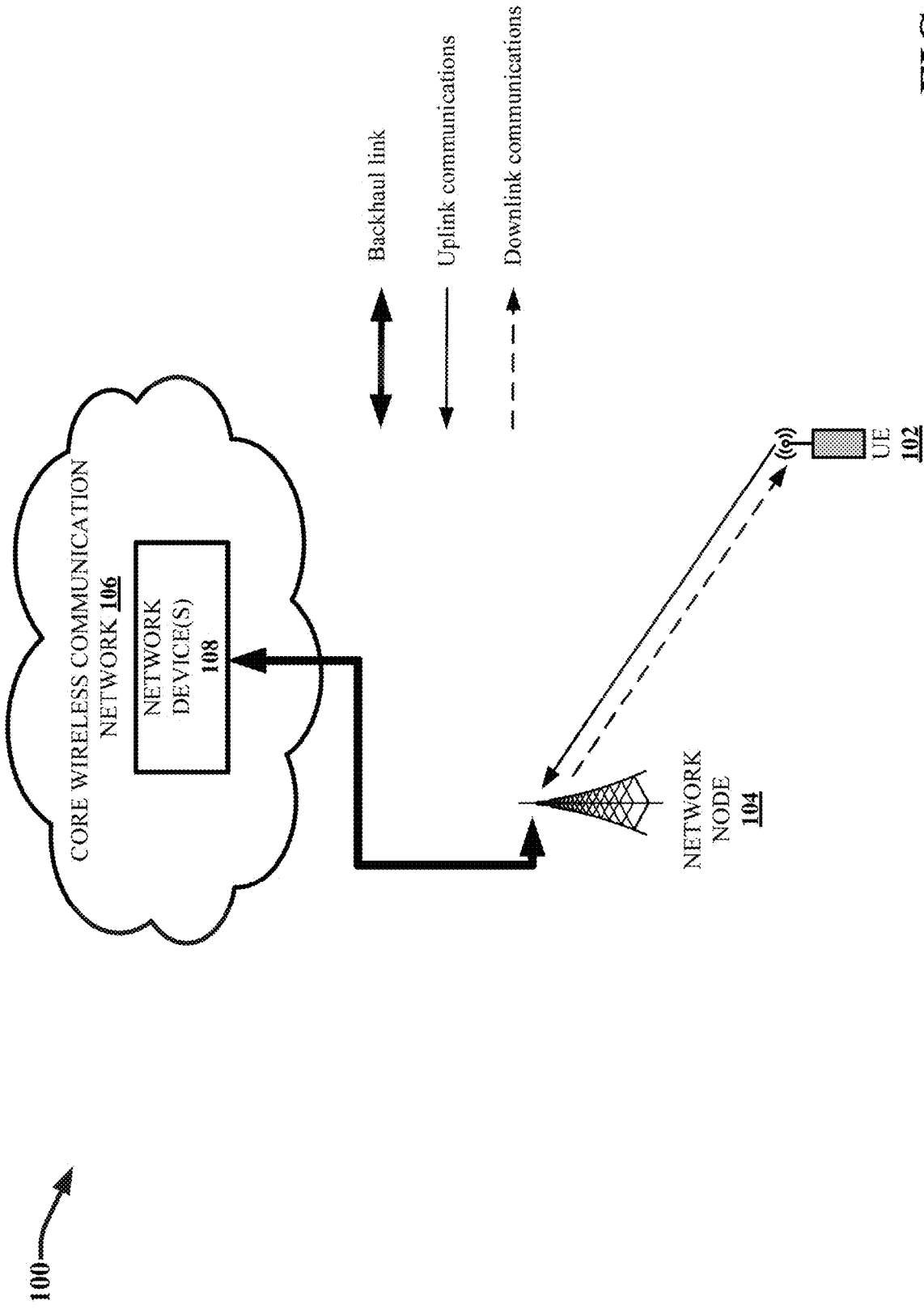
FIG. 1 is an illustration of an example wireless communication system that facilitates managing negotiation of PSM parameters between a UE and core network device in accordance with various aspects and embodiments of the subject disclosure.

One mechanism used to save user equipment (UE) power in LTE and advanced LTE cellular networks is power saving mode (PSM). The PSM process starts after a data link between the UE and a network node is terminated or after a periodic tracking area update (TAU) procedure completes. PSM involves entry into active period for a duration of time during which the UE remains reachable, referred to herein as idle mode (IM), followed by entry into an inactive period for a duration of time during which the UE remains unreachable, referred to herein as low power mode (LPM). The duration of time of the IM is controlled by a first timer, referred to herein as the "active timer" and defined in 3GPP Release 12 and Release 13 as (T3324). During the IM, the UE remains reachable for UE terminated transactions on for the duration of time defined by the active timer upon transmission from being connection to the network node to entry into IM. In IM, UE operates according to a discontinuous reception (DRX) cycle, wherein the UE periodically activates its receiver to receive messages from the network node. In accordance with 3GPP Release 12, the total duration of the IM can be from 0 seconds up to about 186 minutes. During LPM, the UE deactivates its transmitter and receiver and is thus unreachable for a defined duration of time. The duration of time the UE remains in LPM is controlled by one of two timers, referred to herein as the LPM timer and the extended LPM (eLPM) timer, respectively. The LPM timer and the eLPM timer are defined in the 3GGP specification Release 12 as T3412 and extended T3412 (eT3412), respectively. In accordance with 3GGP Release 12, the total duration of the LPM can be from 2 seconds up to about 320 hours. In LPM, the UE remains registered in the network, however the UE does not activate its receiver and thus cannot receive messages. After the LPM duration expires, the UE can be configured to initiate a new TAU or ATTACH procedure with the network node.

In this regard, PSM is a 3GPP Release 12 feature, which forms the backbone of 3GPP's MTC power saving strategy and is a part of LTE category 0 (CAT-0), and CAT-M1 devices. With the PSM approach, the UE can decide how often the UE is to be active in order to transmit and receive data, entering PSM in between times of being active. With PSM, the UE can "sleep" in LPM for durations ranging from about 2 seconds up to 320 hours. Thus, PSM is suitable to extend the battery life of UEs that only rarely communicate with the core network, such as low power sensor devices.

The 3GPP Release 12 allows a UE and the core network to negotiate operating PSM parameters. In particular, with PSM, the UE and the network can negotiate the PSM parameters that control the duration of IM and LMP (i.e., the active timer T3324 and the eLPM timer eT3412) to optimize UE power consumption while balancing network signaling needs. However, current techniques employed to negotiate PSM parameters between the UE and the network impart an unnecessary load on the network.

For example, if a UE supports PSM in order to enter PSM, the UE shall request the use of PSM during an ATTACH procedure or tracking area update (TAU) procedure by including an active mode timer (T3324) value in the request. The network accepts the use of PSM by providing a specific value for the active timer (T3324) when accepting the ATTACH or TAU procedure request message. The UE may use PSM only if the network has provided a value for the active timer (T3324) in the ATTACH or TAU acceptance message that is anything but a "deactivated" value. The ATTACH or TAU acceptance message may also include a value for a LPM timer, or an eLPM timer. If the ATTACH or TAU acceptance message contains the LPM timer (T3412), then the UE shall use the LPM timer (T3412) to control the duration of the LPM. If the ATTACH or TAU acceptance message contains the eLPM timer (eT3412), then the UE shall use the eLPM timer (eT3412) to control the duration of the LPM. If neither a LPM timer (T3412) value nor an eLPM timer (eT3412) value is included in the ATTACH or TAU acceptance message, then the UE shall use the timer value currently stored from a prior ATTACH or TAU acceptance message.

The 3GPP Release 12 specification facilitates negation of PSM parameters by allowing the UE to select a desired value for the active mode timer (T3324) when provided in an ATTACH or TAU request message. If the UE supports eLPM, the UE can also include a UE selected timer value for the eLPM timer (e3412) in the ATTACH or TAU request. The UE can also request a UE desired value for the eLPM timer (eT3412). In some scenarios, the PSM parameters provided by the network to the UE (referred to herein as the network PSM parameters) in an ATTACH or TAU acceptance response are different from the PSM parameters requested by the UE in the attach/TAU request (referred to herein as the UE PSM parameters). For example, a UE may be configured to request a default maximum eLPM period (e.g., 320 hours) in order to conserve power. However, based on signal scheduling constraints, the network may determine that the UE should not apply the requested UE PSM eT3412 value, but instead apply a shorter eLPM timer (eT3412) value (e.g., about 24 hours) or regular LPM timer (T3412) value. In some implementations, the network may not provide an eLPM timer value nor a LPM timer value. Accordingly, in some scenarios, the network ATTACH or TAU acceptance response can authorize the UE to operate using PSM but direct the UE to employ network defined PSM parameters that are different from the UE requested PSM parameters.

The 3GPP specification states the UE is to always honor the network provided PSM parameters, even if they are different that the PSM parameters requested by the UE. However, in this regard, the 3GPP specification only specifies that the UE apply the network provided PSM parameters until the next attach/TAU event. For example, the 3GPP specification specifies that the UE include PSM parameters in each attach or TAU procedure if the UE wishes to use PSM, regardless of whether the UE was previously using PSM. As with the initial attach/TAU request, as defined in the 3GPP specification, the UE and the core network can negotiate the PSM parameters in each subsequent attach/TAU request, even if the previous negotiation resulted in the network providing different PSM parameters than that requested by UE. For example, in every subsequent attach/TAU request sent by the UE, if the UE desires to operate using PSM, the UE can include UE desired PSM parameters in the attach/TAU request, even if the network previously denied usage of the UE desired PSM parameters and directed the UE to use different network PSM parameters. The 3GPP specification does not define how to manage the negotiation of PSM parameters between UE and the core network. As a result, in many scenarios, there can be a continuous deadlock wherein the UE continuously requests preferred UE PSM parameters in each attach/TAU request and the network continuously responds with network PSM parameters that are different from the preferred UE PSM parameters. This type of deadlock scenario causes unnecessary strain on the network, which can become exponentially exacerbated as the number of devices the network regularly negotiates PSM parameters with grows.

The subject disclosure is directed to computer processing systems, computer-implemented methods, apparatus and/or computer program products that facilitate managing negotiation of PSM parameters between a UE and core network device. For example, the subject disclosure describes a mechanism that involves deploying a PSM retry protocol at the UE. The proposed PSM retry protocol provides a solution to guide the UE/chipset to honor the network provided PSM parameters after reaching the maximum number of attempts to negotiate UE preferred PSM parameters, referred to herein as a "retry" attempt. With the subject UE based PSM retry protocol, the network can continue to control PSM parameters employed by respective UEs serviced by the network. Thus, the network can continue to optimize network provided PSM parameters in view of both current network and current device requirements. At the same time, the network processing load associated with determining whether to authorize UE requested PSM parameters in view of network logistics will be lowered. For example, after the maximum number of retry attempts is reached, the UE can be configured to stop requesting UE preferred PSM parameters in attachment and TAU requests. The UE can simply include the previously provided network PSM parameters in the attachment and TAU requests. Thus the network will not need to re-evaluate the UE requested PSM parameters and directly respond to the attachment or TAU request with the requested network PSM parameters, (which the network had previously authorized the UE to employ), thereby reducing data processing and power consumption by the network.

In addition, the subject retry mechanism allows the network to control the PSM retry protocol employed by the UE based on network load. For example, the network can control enabling and disabling the PSM retry protocol as well as the maximum number off retry attempts allowed. In some embodiments, the PSM retry protocol can be implemented on the network provided/configured subscriber identity module (SIM) card or universal integrated circuit card (UICC) of the UE. According to these embodiments, the network can control the PSM retry protocol using over the air (OTA) messaging protocol. From the UE side, the UE will begin using network preferred PSM parameters after a certain number of retry attempts. The UE can further log information regarding network preferred PSM parameters. This logged information can be sent to and employed by chipset vendors or device vendors to analyze and optimize their design for certain applications.

In one or more embodiments, a method is provided that includes facilitating establishing, by a device comprising a processor, a wireless communication link with a network device of a wireless network. The method further includes, based on a determination that a power saving mode retry protocol for the device is enabled, determining, by the device, a number of times the network device previously instructed the device to use network values for PSM timers instead of device values for the PSM timers in association with the device operating in a PSM. In some implementations the method can further include, in response to a determination that the number of times does not exceed a threshold retry number, sending, by the device to the network device, a request to use the device values for the PSM timers in association with the device operating in the PSM. In an aspect, the sending the request comprises sending an attachment message to the network device via the wireless communication link, and wherein the attachment request comprises the device values for the PSM timers. In another aspect, the sending the request comprises sending a TAU message to the network device via the wireless communication link, and wherein the TAU message comprises the device values for the PSM timers.

In other implementations, the method can further include, in response a determination that the number of times exceeds a threshold retry number, sending, by the device to the network device, a request to use the network values for the PSM timers in association with the device operating in the PSM. In accordance with various embodiments, the network values for the PSM timers were previously received by the device from the network device in response to a previous request, sent by the device to the network device, for authorization to use the device values for the PSM timers in association with the device operating in the PSM, and wherein the device previously employed the network values for the PSM timers in association with the device operating in the PSM.

In another embodiment, an integrated circuit card device is provided that comprises a processor, and a memory that stores executable instructions that, when executed by the processor, facilitate performance of operations. These operations can comprise, based on a determination that a PSM retry protocol is enabled, determining a number of times that a device, operatively coupled to the integrated circuit card device, was previously instructed by a network device of a wireless communication network to use a network value for a PSM parameter instead of a device value for the PSM parameter in connection with the device operating in a PSM. These operations can further comprise, directing the device to send a request to the network device requesting usage of the device value in connection with the operating in the PSM based on the number being determined to be less than a threshold retry number, and directing the device to send a second request to the network device requesting usage of the network value in connection with the operating in the PSM based on the number being determined to be greater than or equal to the threshold retry number. In some embodiments, the integrated circuit card device is a SIM card of the device. In other embodiments, the integrated circuit card device is a UICC of the device.

In yet another embodiment a machine-readable storage medium, comprising executable instructions that, when executed by a processor of a device, facilitate performance of operations. These operations can include determining a number of times the device was previously instructed by a network device of a wireless communication network to use a network timer value for a PSM instead of a device timer value for the PSM when the device is operating in the PSM. The operations further comprise, sending a first request to the network device requesting usage of the device timer value for when the device is operating in the PSM based on the number being determined to be less than a threshold retry number. In various implementations, the operations can further comprise, sending a second request to the network device requesting usage of the network timer value for when the device operating in the PSM based on the number being determined to be greater than or equal to the threshold retry number.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of an example wireless communication system 100 that facilitates managing negotiation of PSM parameters between a UE and core network device in accordance with various aspects and embodiments of the subject disclosure. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The wireless communication system 100 can be or include various types of disparate networks, including but not limited to: cellular networks, femto networks, picocell networks, microcell networks, internet protocol (IP) networks Wi-Fi service networks, broadband service network, enterprise networks, cloud based networks, and the like. System 100 can comprise one or more UEs 102, a network node 104 and a core wireless communication network 106. It should be appreciated that a single UE 102 is depicted for exemplary purposes and that any number of UEs can be included in system 100. The UE 102 can include a variety of different mobile and stationary device types that can be configured to operate using PSM and the subject PSM retry protocol. For example, the UE 102 can include but is not limited to: a cellular phone, a smartphone, a tablet computer, a wearable device, a virtual reality (VR) device, a heads-up display (HUD) device, and the like. In various exemplary embodiments, the UE 102 can be configured with MTC or machine to machine (M2M) capabilities. For example, PSM will have a strong impact on MTC devices (e.g., Cat-M1, Cat-M2 devices, narrowband (NB)-IoT devices, Cat-0 devices, Cat-1 devices and the like). For example, the UE 102 can be or include metering devices, implantable medical device (IMDs), sensor and/or control devices associated with home automation systems, tracking devices, point of sale devices (e.g., vending, machines), security devices (e.g., associated with surveillance systems, homes security, access control, etc.), and the like. The terms MTC and M2M are used herein interchanged. A UE that is configured to perform one or more MTC functionalities is referred to herein as an MTC device.

The UE 102 can be configured to communicate with the core wireless communication network 106, and more particularly one or more network devices 108 of the core wireless communication network 106, using a communication link established between the UE 102 and a network node 104 of the wireless communication network. The network node 104 can be connected to the core wireless communication network 106 (or one or more network devices 108 of the core wireless communication network 106) via one or more backhaul links (indicated by the thick arrow line). For example, the one or more backhaul links can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation). The thin solid arrow line from the UE 102 to the network node 104 represents uplink communications and the thin dashed arrow line from the network node 104 to the UE 102 represents downlink communications. Communication links between a UE and a network access point device, such as network node 104, are referred to herein as machine-to-network (M2N) communication links. In some implementations, the UE 102 can be configured to communicate with one or more other UEs another using a machine-to-machine (M2M) link. Further, in some implementations, a UE 102 can serve as a network access point device to other UEs via which the other UEs can communicate with the network node 104.

The non-limiting term network node (or radio network node) is used herein to refer to any type of network node serving a UE 102 and/or connected to other network node, network element, or another network node from which the UE 102 can receive a radio signal. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like.

The wireless communication system 100 can employ various wireless communication technologies and modulation schemes to facilitate wireless radio communications between devices (e.g., between UEs 102 and between UEs 102 and the network node 104, between the network node 104 and one or more network devices 108, etc.). For example, the UEs 102 can be configured to communicate with the network node 104, and vice versa using various wireless communication technologies, including but not limited to: Universal Mobile Telecommunications System (UMTS) technologies, LTE technologies, advanced LTE technologies (including voice over LTE or VoLTE), narrowband IoT (NB-IoT), Code Division Multiple Access (CDMA) technologies, Time Division Multiple Access (TDMA) technologies, Orthogonal Frequency Division Multiplexing (OFDN) technologies, Filter Bank Multicarrier (FBMC) technologies, Wireless Fidelity (Wi-Fi) technologies, Worldwide Interoperability for Microwave Access (WiMAX) technologies, General Packet Radio Service (GPRS) technologies, Enhanced GPRS, technologies, Second Generation Partnership Project (2GPP) technologies, 3GPP technologies, Fourth Generation Partnership Project (4GPP) technologies, Fifth Generation Partnership Project (5GPP) technologies, Ultra Mobile Broadband (UMB) technologies, High Speed Packet Access (HSPA) technologies, Evolved High Speed Packet Access (HSPA+), High-Speed Downlink Packet Access (HSDPA) technologies, High-Speed Uplink Packet Access (HSUPA) technologies, ZIGBEE® technologies, or another IEEE 802.XX technology. Additionally, substantially all aspects disclosed herein can be exploited in legacy telecommunication technologies. In some embodiments, the UEs can be configured to communicate with one another (e.g., via M2M links) using suitable local area network (LAN) or personal area network (PAN) communication technologies and configured to communicate with the network node 104 using suitable WAN communication technologies. For example, in one or more embodiments, the UEs 102 can be configured to communicate with one another using BLUETOOTH®, BLUETOOTH® low energy (BLE), near field communication (NFC), Wi-Fi protocol, ZIGBEE®, RF4CE, WirelessHART, 6LoWPAN, Z-Wave, ANT, and the like. The one or more UEs 102 can be further configured to communicate with the network node 104 using one or more of the radio access network (RAN) technologies listed above (e.g., LTE, VoLTE, UMTS, etc.).

The core wireless communication network 106 can include various network devices 108 that facilitate providing wireless communication services to the UEs 102 via the network node 104 and/or various additional network devices (not shown). For example, the one or more network devices 108 of the core wireless communication network 106 can include but are not limited to: mobile switching center (MSCs) devices, a home location register (HLR) device, a visitor location register (VLR) device, authentication center (AUC) devices, provisioning servers, billing servers, operation and support system (OSS) devices, short message service center (SMSC) devices, and many other elements. In some implementations, the one or more network devices 108 includes a mobility management entity (MME) device. For example, the system architecture evolution (SAE) is the core network architecture of 3GPP's LTE wireless communication standard. In accordance with SAE, the MME is the key control-node for the LTE access-network. The MME is involved in the bearer activation/deactivation process and is also responsible for choosing the serving gateway (SGW) for a UE at the initial attach, the TAU procedure, and at time of intra-LTE handover involving core network (CN) node relocation. The MME is also responsible for idle mode UE paging and tagging procedure including retransmissions. In various embodiments, the MME can also be configured to control PSM parameter negotiation between the UE and the core wireless communication network 106 in accordance with various aspects and embodiments disclosed herein.

In accordance with various aspects and embodiments described herein, system 100 can be configured to facilitate managing PSM parameter negotiation between the UE 102 and the core wireless communication network 106 that provides at least some wireless communication services to the UE via an M2N connection between the UE 102 and the network node 104. In one or more embodiments, the UE 102 is configured to operate using IM and PSM.

Figure 2:
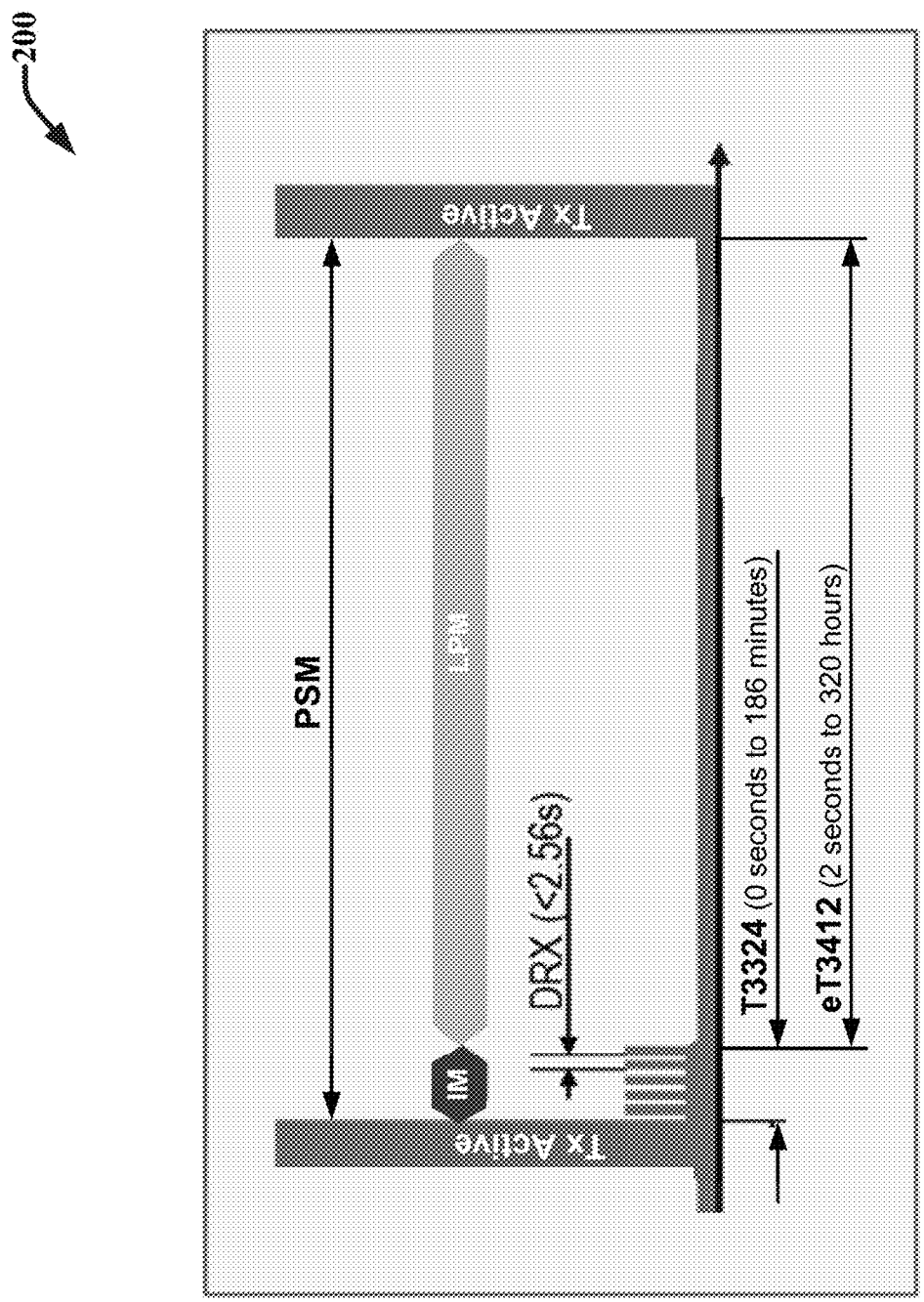
FIG. 2 provides a graphical illustration demonstrating principles of PSM in accordance with various aspects and embodiments of the subject disclosure.

FIG. 2 provides a graphical illustration 200 demonstrating principles of PSM in accordance with various aspects and embodiments of the subject disclosure. The PSM is an operating mode between transmission events wherein the UE operates in an IM for a short period of time (e.g., 0 seconds to 186 minutes) following completion of a communication session with a network node, and then enters a LPM for another duration of time (e.g., from 2 seconds to 320 hours), during which the UE turns off its transmitter and receiver for an extended sleep period. Accordingly, a total duration of the PSM can range from 0 seconds to about 13.5 days. The IM is an operating mode in which the UE alternates between activating and deactivating its receiver, (an operating mode also referred to as discontinuous reception or DRX). During IM, the UE listens for paging messages or messages sent via downlink control channels used by the network to reach the UE. The duration of time associated with each receiver activation/deactivation event is referred to as the DRX period or cycle. The duration of the IM is controlled by the active timer (T3324). In various embodiments, the active timer reflects a number of DRX cycles and a duration of the respective DRX cycles. In some implementations the DRX cycle duration is less than about 2.56 seconds). In one or more embodiments, the active timer cannot be less than two DRX cycles and 10 seconds. According to these embodiments, if the UE requested active timer (T3324) is less than this duration, the UE can be configured to automatically increase the active timer duration to be two DRX cycles plus 10 seconds. The LPM is an operating mode in which the UE "sleeps" to conserve power by deactivating its transmitter and receiver, thus operating in an unreachable state. The duration of the LPM is controlled by a LPM timer, which can be an eLPM timer (eT3412) or a regular LPM timer (T3412). The term PSM parameters is used herein to refer to parameters related to both active timer (T3312), and the LPM timer (eT3412 or T3412).

Figure 3:
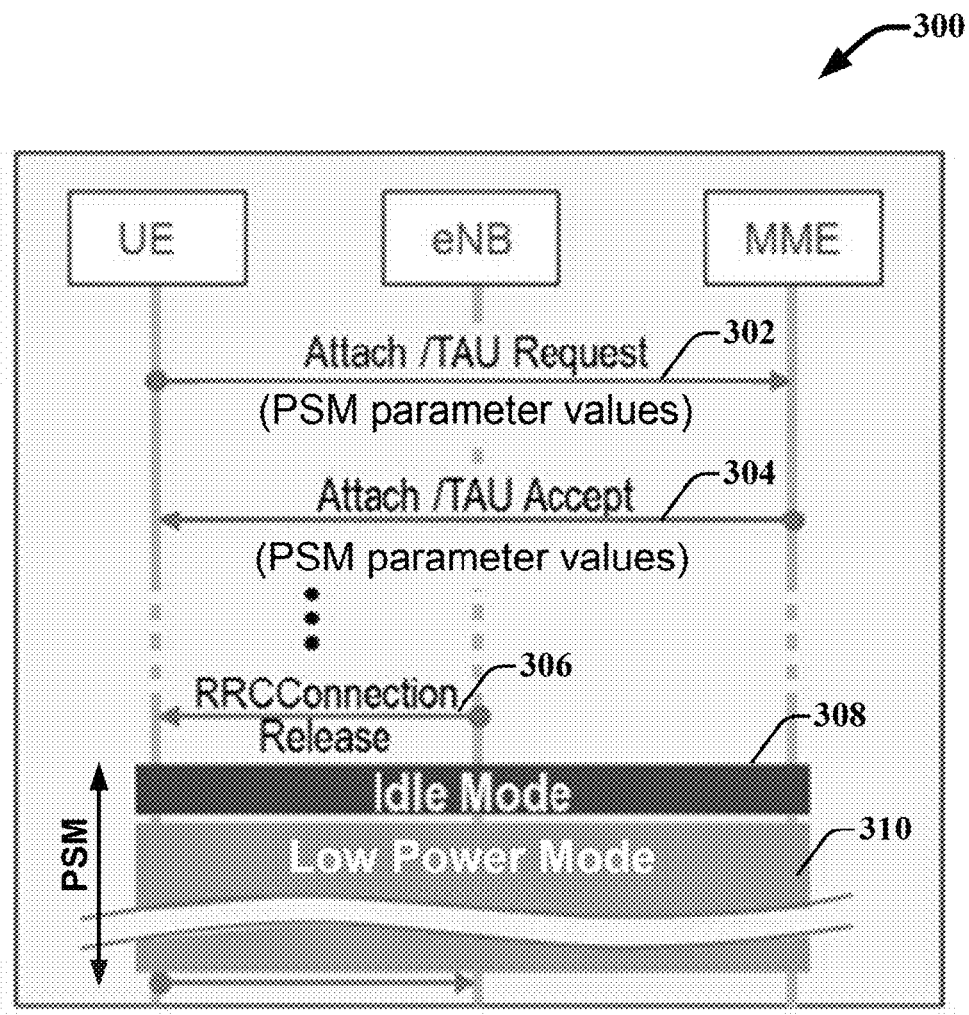
FIG. 3 provides a signaling diagram demonstrating a procedure for negotiating PSM parameters between a UE and a core network device in accordance with various aspects and embodiments of the subject disclosure.

FIG. 3 provides a signaling diagram 300 demonstrating a procedure for negotiating PSM parameters between a UE and a core network device in accordance with various aspects and embodiments of the subject disclosure. In the embodiment shown, the core network device includes an MME device. An eNodeB (eNB) serves as the network node (e.g., network node 104) that communicatively connects the UE with the MME.

As described in 3GPP Release 12, in order to enter PSM, the UE shall request the use of PSM during an ATTACH procedure or TAU procedure by including PSM parameters in the attach request or the TAU request, as shown in signaling event 302. As described above, the PSM parameters must include a value for the active timer (t3324) if the UE desires to use PSM mode. If the UE supports eLPM, the PSM parameters may (optionally) include a value for the eLPM timer (e3412) that controls a duration of the LPM. In some embodiments, the PSM parameters can also include information that controls the duration and/or number of the DRX periods of the IM. In many implementations, the PSM parameters provided by the UE in the ATTACH or TAU request are UE PSM parameter values that are desired or preferred by the UE. For example, the UE preferred PSM parameter values can include default UE PSM parameters values programmed into the UE. In another example, the UE preferred PSM parameter values can include PSM parameter values determined by the UE based on various operations of the UE. In other implementations, as described in greater detail infra, the PSM parameter values provided by the UE in the attach/TAU request will include previously provided network PSM parameter values if the UE has reached the maximum amount of PSM negotiation retries.

The network can authorize a UE to operate using PSM by responding to the UE attach or TAU request and including PSM parameter values in the response, as shown in signaling event 304. These network provided PSM parameters will include at least a value for the active timer (T3324). In some implementations, the PSM parameters will also include a value for the LPM timer (e.g., either T3412 or eT3412). In other implementations, the network ATTACH/TAU acceptance message may not include either a T3412 or eT3412 value). The UE then disconnects from the eNB as shown in signaling event 306 (e.g., via a radio resource control (RCC) connection release) and at 308 begins operating in the IM according to the active timer value (e.g., t3324) included in the network provided PSM parameter values received from the MME in the attach/TAU accept message. Then after the IM duration timer has expired, at 310, the UE enters the LPM for the duration defined by the network provided LPM timber value (e.g., eT3412 or T3412) included in the PSM parameter values received from the MME in the attach/TAU accept message. If the network ATTACH/TAU acceptance message does not include an eT3412 or T3412 value, the UE can be configured to employ a previously received or applied LPM timer value (e.g., the most recently network provided LPM timer). In particular, as defined in 3GPP Release 12 (e.g., TS 24.301), the UE shall only operate using PSM if the network provides PSM parameters when accepting an attach request or TAU request and the UE shall always honor the network provided PSM parameter values.

With reference to FIGS. 1, 2 and 3, in some scenarios, the network PSM parameter values provided to the UE 102 by the network device (e.g., a network device 108, such as an MME device) in an attachment or TAU acceptance response (e.g., signaling event 304) are different from the PSM parameter values requested by the UE in the attach/TAU request. The 3GPP specification specifies that the UE 102 is to always honor the network provided PSM parameters, even if they are different that the PSM parameters requested by the UE. However, the 3GPP specification only specifies that the UE 102 apply the network provided PSM parameters until the next attach/TAU event. For example, according to the 3GPP specification, in every subsequent attach/TAU request sent by the UE 102, if the UE desires to operate using PSM, the UE 102 can include UE desired PSM parameters in the attach/TAU request, even if the network previously denied usage of the UE desired PSM parameters and directed the UE to use different network PSM parameters. The 3GPP specification does not define how to manage the negotiation of PSM parameters between UE and the core network. As a result, in many scenarios, there can be a continuous deadlock wherein the UE continuously requests preferred UE PSM parameters in each attach/TAU request and the network continuously responds with network PSM parameters that are different from the preferred UE PSM parameters. This type of deadlock scenario causes unnecessary strain on the network, which can be exponentially exacerbated as the number of devices the network regularly negotiates PSM parameters with grows.

In order to mitigate the aforementioned deadlock scenario, in accordance with various embodiments of the subject disclosure, the UE 102 in association with being configured to operate using PSM, the UE can further be configured with a PSM retry control functionality. The PSM retry control functionality can provide a PSM retry protocol that when executed by a processor of the UE 102, controls the maximum number of times the UE 102 can negotiate UE desired PSM parameters with the core wireless communication network 106, (e.g., via a network device 108 of the core wireless communication network 106, such as an MME device), after the network has previously instructed the UE 102 to use network PSM parameters that are different from the UE requested PSM parameters. In one or more embodiments, the retry control functionality can control the maximum number of times, referred to herein as N-max, that the UE can negotiate the active timer value that controls the duration of the IM (i.e., T3324). The retry control functionality can also control the maximum number of times, referred to herein as M-max, that the UE can negotiate a second timer value that controls the duration of the LPM (i.e., the eT3412 value).

For example, in accordance with the PSM retry control protocol, the UE 102 can track the number of times the UE requests UE preferred PSM parameter values (e.g., for T3324 and/or eT3412) in attach and TAU procedures yet is directed by the network 106 to employ network PSM parameter values (e.g., for T3324 and/or eT3412) that are different from the UE requested PSM parameter values. In association with each new attach or TAU procedure, based on the PSM retry control protocol, the UE 102 can determine whether the number of times (the retry number N and/or M) that the UE was directed by the core wireless communication network 106 to employ network PSM parameters after requesting different UE PSM parameters is greater than or equal to the maximum retry amount (the maximum retry number N-max and/or M-max). If the retry number is not greater than or equal to the maximum retry number, then the UE 102 can include its preferred UE PSM parameters in the attach or TAU request. However, if the retry number is greater than or equal to the maximum retry number, based on the retry protocol, the UE can be configured to include the previously provided network PSM parameters in the attach or TAU request. As a result, in response to reception of the attach or TAU request, the core wireless communication network 106 (e.g., a network device 108 of the core wireless communication network 106, such as an MME device) will not need to determine whether the network should authorize the UE to apply its requested UE PSM parameters. The network will merely see the UE is requesting usage of PSM parameters that have already been authorized by the network, skip the negotiation process, and direct the UE to employ the requested network PSM parameters in the networks attach accept or TAU accept message. The UE 102 can also continue to provide the network PSM parameters in each subsequent attach or TAU request if the UE desires to operate using PSM unless the UE is power cycled, rebooted, reset, enters and exits airplane mode or the like, which can result in setting current retry number count back to its default value (e.g., zero).

In addition, in some embodiments, the core wireless communication network 106 can control the PSM retry protocol employed by the UE based on network load, signal scheduling constraints, UE power and service requirements, and other possible factors. For example, the network can control enabling and disabling the PSM retry protocol on the UE as well as the maximum number off retry attempts allowed one or more of the PSM parameters. For instance, the network can control the maximum number of times the UE can negotiate the first timer that controls the IM duration (N-max). The network can also control the maximum number of times the UE can negotiate the second time that controls the duration of the PSM (M-max). In another example, the core wireless communication network 106 can reset the number of UE PSM retry negotiation attempts (e.g., N or M). In some embodiments, the PSM retry protocol can be implemented on the network provided/configured subscriber identity module (SIM) card or universal integrated circuit card (UICC) of the UE. According to these embodiments, the core wireless communication network 106 can control the PSM retry protocol of the UE using over the air (OTA) messaging protocol. For example, the UE can include a SIM card or UICC that has been programmed to include the subject PSM retry control functionality. In one implementation, the PSM retry control functionality can include an PSM retry flag that can be set to one of two possible values, wherein a first value (e.g., one) can enable the PSM retry functionality and a second value (e.g., zero) can disable the PSM retry functionality. The core wireless communication network 106 can further control enablement and disablement of the PSM retry functionality of the UE 102 by sending the UE an OTA message, via a communication link established between the network node 104 and the UE 102, that directs the UE to set the retry flag to either the first value or the second value. In another implementation, the PSM retry control protocol on the UE SIM/UICC can define a value for N-max and/or M-max and the core wireless communication network 106 can also set the value for N-max and/or M-max using an OTA message sent to the UE 102.

Figure 4:
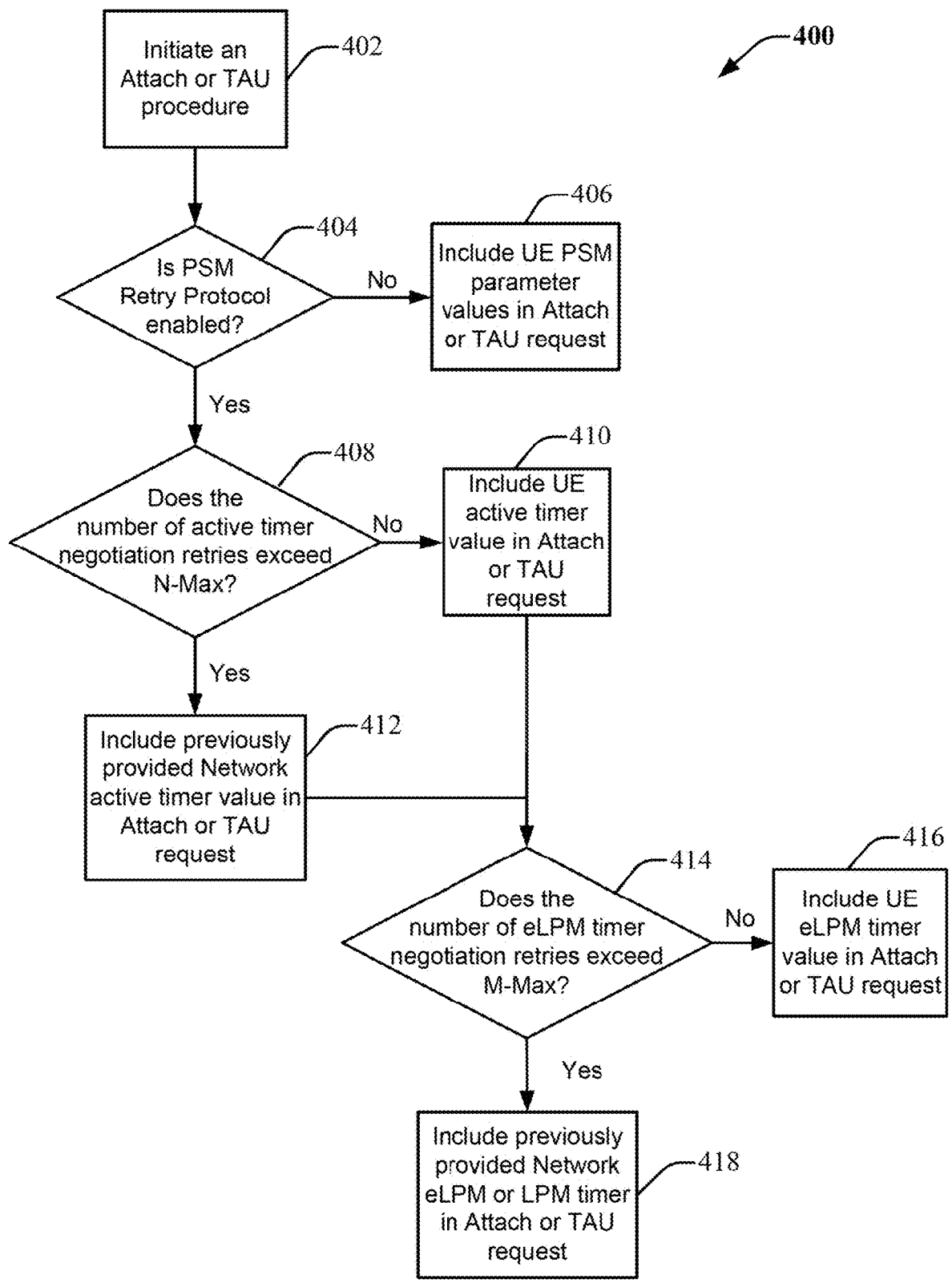
FIG. 4 provides a flow diagram of an example method for managing negotiation of PSM parameters between a UE and core network device in accordance with various aspects and embodiments of the subject disclosure.

FIG. 4 provides a flow diagram of an example method 400 for managing negotiation of PSM parameters between a UE and core network device in accordance with various aspects and embodiments of the subject disclosure. In one or more embodiments, method 400 is performed by a UE (e.g., UE 102) in association with operating in a wireless communication network (e.g., system 100). In accordance with method 400, the UE is configured to operate using eLPM in association with PSM. Accordingly, the UE can negotiate both the active timer (eT3324) value and the eLPM timer (eT3412) value with the network in accordance with the subject retry protocol. Repetitive description of like elements employed in respective embodiments is omitted for sake of brevity.

At 402, the UE initiates an ATTACH or TAU procedure 402. For example, the UE can activate its transmitter and receiver and establish a wireless communication link with a network node (e.g., network node 104) of a wireless communication network that the UE is subscribed to or otherwise authorized to connect to. In association with initiating the ATTACH or TAU procedure, at 404, the UE determines whether a PSM retry protocol functionality of the UE is enabled. For example, the UE can check to see whether a PSM retry flag of the UE is set to an enabled value (e.g., one) or a disabled value (e.g., zero). If the PSM retry protocol is disabled, then the UE can forgo performance of the subject PSM retry control protocol and include UE preferred PSM parameter values in the attach or TAU request, as indicated at 406. If however the PSM retry protocol is enabled, then at 408, the UE determines whether the number of active timer negotiation retries (N) exceeds N-max (e.g., the maximum number of active timer (t3324) negotiation retries the UE is authorized to perform). If at 408, N does not exceed N-max, then the UE can include a UE preferred active timer value in the ATTACH or TAU request, as indicated at 410. If however N does exceed N-max, then at 412, the UE will include the previously provided network active timer value in the ATTACH or TAU request. Then at 414, the UE determines whether the number of eLPM timer negotiation retries (M) exceeds M-max (e.g., the maximum number of eLPM timer (eT3412) value negotiation retries the UE is authorized to perform). If at 414, M does not exceed M-max, then the UE can include a UE preferred eLPM timer value in the ATTACH or TAU request, as indicated at 416. If however M does exceed M-max, then at 418, the UE will include the previously provided network eLPM or LPM timer value in the ATTACH or TAU request.

Figure 5:
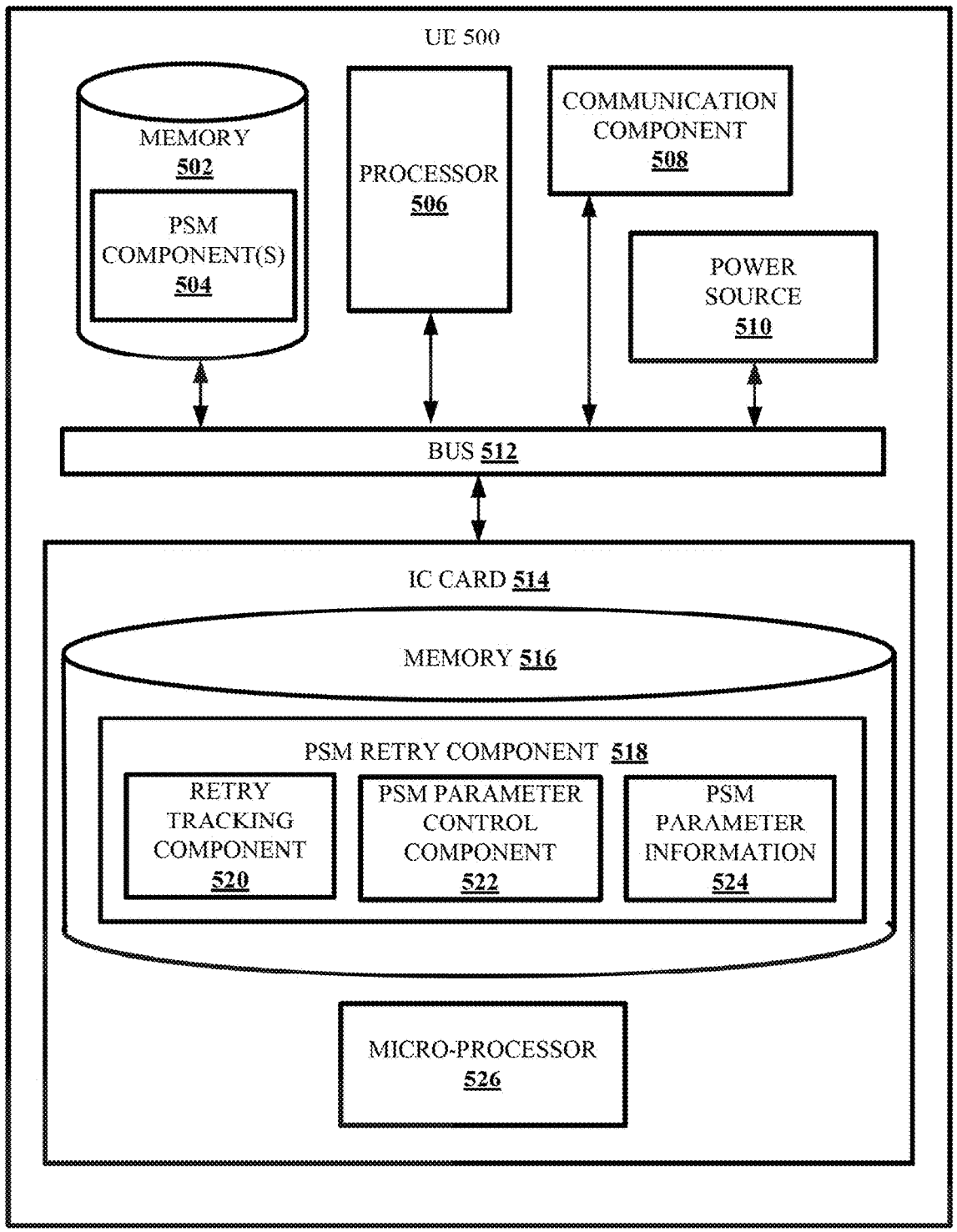
FIG. 5 presents an example UE configured to employ a PSM retry protocol in association with negotiating PSM parameters between the UE and the network in accordance with various aspects and embodiments of the subject disclosure.

FIG. 5 presents an example UE 500 configured to employ a PSM retry protocol in association with negotiating PSM parameters between the UE and the network in accordance with various aspects and embodiments of the subject disclosure. In various embodiments, the UE 102 of system 100 can be or include UE 500, or vice versa. Repetitive description of like elements employed in respective embodiments is omitted for sake of brevity.

The UE can include memory 502 configured to store computer executable components and instructions. For example, in various embodiments, these computer executable components and instructions can include one or more PSM components 504. The one or more PSM components 504 can include information and instructions that control one or more defined PSM operations of the UE. For example, the PSM components 504 can include information and instructions regarding when the UE should employ PSM. In another example, the PSM components 504 can include information and instructions that define preferred or default UE PSM parameter values, such as a preferred active timer and eLPM timer values for the IM period and the LPM period, respectively. In another example, the PSM components 504 can include information and instructions that control how the UE can execute PSM, such as instructions regarding how to request PSM in an ATTACH or TAU request, and how to enter into PSM based on reception of attach or TAU acceptance messages including network PSM parameters. The UE 500 can also include a processor 506 to facilitate operation of the instructions (e.g., the computer executable components and instructions) by the UE (e.g., the one or more PSM components 504). The UE 500 further includes a communication component 508, a power source 510, an integrated circuit (IC) card 514 and a device bus 512. The device bus 512 can couple the various components of the UE 500 including, but not limited to, the memory 502, the processor 506, the communication component 508, the power source 510, and the IC card 514. Examples of said processor 506 and memory 502, as well as other suitable computer or computing-based elements that can be employed by the UE, can be found with reference to FIG. 11.

The communication component 508 can facilitate wireless communication between the UE and other devices, such as between the UE 500 and other UEs via an M2M link and/or between the UE 500 and a wireless communication system network node (e.g., network node 104). The communication component 508 can be or include hardware (e.g., a central processing unit (CPU), one or more transmitters, one or more receivers, one or more transceivers, one or more decoders), software (e.g., a set of threads, a set of processes, software in execution) or a combination of hardware and software that facilitates one or more of the various types of wireless communications described herein. The power source 510 can provide power to the various electrical components of the UE 500 to facilitate operation thereof (e.g., the processor 506, the communication component 508, the IC card 514, etc.). The power source 510 can include, but is not limited to, a battery, a capacitor, a charge pump, a mechanically derived power source (e.g., microelectromechanical systems (MEMs) device), or an induction component.

The IC card 514 can include a fixed or removable integrated circuit chip. The IC card can include memory 516 that stores information and computer executable components or instructions. In the embodiment shown, these computer executable components can include the PSM retry component 518. In other embodiments, the PSM retry component 518 (and/or one or more sub-components of the PSM retry component 518) can be provided in memory 502. In another embodiment, one or more of the PSM components 504 can be provided in memory 516 of the IC card 514. In some embodiments, the IC card 514 can include a micro-processor 526 to facilitate operation of at least some the instructions stored in the memory 516 (e.g., the PSM retry component 518). In other embodiments, the UE can be configured to employ processor 506 to execute the instructions stored in memory 516 (e.g., the PSM retry component 518).

In one or more embodiments, the IC card 514 is a SIM card or a UICC that stores network subscriber data (not shown) that includes network-specific information used to authenticate and identify a subscriber on a wireless communication network (e.g., system 100). The terms SIM card and UICC are used herein interchangeably to refer to an integrated circuit card that provides same or similar features and functionalities when employed in association with a UE that is configured to operate using a wireless communication network. In general, the SIM card and the UICC can contain unique information that identifies a UE to a wireless communication network with which the SIM card or UICC is registered and enables the UE to operate using the wireless communication network. For example, the network subscriber data can include but is not limited to, a unique serial number (ICCID) associated with the subscriber, an IMEI number associated with the subscriber, security authentication and ciphering information, temporary information related to the local network, a list of the services the subscriber has access to, and password information (e.g., a personal identification number (PIN) for ordinary use, and a personal unblocking code (PUK) for PIN unlocking. The UICC is considered a next generation SIM card and has applications beyond GSM networks. In addition to storing network subscriber data, the IC card 514 can include one or more SIM application toolkit (STK) or card application toolkit (CAT) applications that consist of a set of commands programmed into the SIM/UICC card which define how the SIM/UICC should interact directly with the outside world and initiates commands independently of the UE and the network. This enables the SIM/UICC to build up an interactive exchange between a network application and the end user and access or control access to the network. In one or more embodiments, at least one of these STK or CAT applications can be or include the PSM retry component 518.

In accordance with various embodiments, the PSM retry component 518 can provide the subject PSM retry protocol that controls the maximum number of times the UE 102 can negotiate UE desired PSM parameters with the core wireless communication network (via a network device 108 of the core wireless communication network 106, such as an MME device), after the network has previously instructed the UE 102 to use network PSM parameters that are different from the UE requested PSM parameters. For example, these PSM parameters can include the active timer value (T3324) and the eLPM timer value (eT3412). Thus the PSM retry control component 518 can control the maximum number of times the UE can negotiate the IM timer value (N-max) and/or the maximum number of times the UE can negotiate the PSM timer value (M-max). In some implementations, the PSM retry component 518 and be enabled or disabled, wherein when enabled, the UE is be configured to execute the PSM retry protocol (e.g., using micro-processor 526 or processor 506), and wherein when disabled, the UE is be configured to negotiate PSM parameters without the subject PSM retry protocol (e.g., according to the protocol defined by the one or more PSM components 504). For example, the PSM retry component 518 can include a retry flag that can be set to a first value (e.g., one) to enable the PSM retry functionality of the PSM retry component 518 or a second value (e.g., zero) to disable the PSM retry functionality. In one or more embodiments, the core wireless communication network (e.g., a network device 108 of the core wireless communication network 106) can control enabling and disabling the PSM retry component 518 using an OTA message.

In various embodiments, the PSM retry component 518 can include retry tracking component 520, PSM parameter control component 522, and PSM parameter information 524. When the PSM retry component 518 is enabled, the retry tracking component 520 can be configured to track the number of times the UE sends an attach or TAU request with UE preferred parameters yet is instructed by the network, via the attach or TAU acceptance message, to employ network PSM parameters that are different from the UE requested PSM parameters. For example, the retry tracking component 518 can track the number of times N the UE requests a UE preferred or default active timer (T3324) value and the number of times M the UE requests a UE preferred or default eLPM timer (eT3412) value. The retry tracking component 520 can further store information regarding the number of "failed" PSM negotiation attempts with respect to the IM timer value (N) and the number of "failed" PSM negotiation attempts with respect to the PSM timer value (M), in memory 516 (e.g., as PSM parameter information 524). In some implementations, the information regarding the number of failed PSM negotiation attempts can merely include the tracked numbers N and M. In other implementations, the retry tracking component 520 can further store information in memory 516 (e.g., as PSM parameter information 524), that identifies the specific network provided PSM parameter values that were applied by the UE in response to the failed PSM negotiation procedure. For example, the PSM parameter information 524 can also include the network provided active timer value for the IM and/or network provided eLPM or LPM timer value. The retry tracking component 520 can also store, as PSM parameter information, information identifying the UE preferred PSM parameter values that were rejected by the network (e.g., the UE preferred active time and/or eLPM timer values).

The PSM parameter control component 522 can be configured to control what PSM parameters the UE provides in each attach or TAU request. For example, each time the UE initiates an attach or TAU request, when the PSM retry component 518 is enabled, the PSM parameter control component 522 can determine whether the value N (included in the PSM parameter information 524) is greater than or equal to N-max. The value N-max can also be included in memory 516 (e.g., in the PSM parameter information 524) and accessible to the PSM parameter control component 522. In some implementations, the network (e.g., core wireless communication network 106) can set the value N-max. For example, the network can send the UE 500 an OTA message that that directs the UE 500 to set N-max to a specific value (e.g., 5). In response to a determination that N is less than N-max, the PSM parameter control component 522 can direct or authorize the UE to include a UE preferred active timer (T3324) value in the attach/TAU request. However, in response to a determination that N is greater than or equal to N-max, the PSM parameter control component 522 can direct the UE to include, in the attach/TAU request, the network active timer (T3324) value that was most recently previously provided to the UE by the network and employed by the UE. Information identifying the most recently previously provided and employed network eLPM timer (eT3412) or LPM timer (T3412) value can be stored in memory 516 (e.g., as PSM parameter information 524).

In addition, each time the UE initiates an attach or TAU request, when the PSM retry component 518 is enabled, the PSM parameter control component 522 can also determine whether the value M (included in the PSM parameter information 524) is greater than or equal to M-max. The value M-max can also be included in memory 516 (e.g., in the PSM parameter information 524) and accessible to the PSM parameter control component 522. In some implementations, the network (e.g., core wireless communication network 106) can set the value M-max. For example, the network can send the UE 500 an OTA message that that directs the UE 500 to set M-max to a specific value (e.g., 5). In response to a determination that M is less than M-max, the PSM parameter control component 522 can direct or authorize the UE to include a UE preferred eLPM timer (eT3412) value in the attach/TAU request. However, in response to a determination that M is greater than or equal to M-max, the PSM parameter control component 522 can direct the UE to include, in the attach/TAU request, the network eLPM timer (eT3412) or LPM timer (T3412) value that was most recently previously provided to the UE by the network and employed by the UE. Information identifying the most recently previously provided and employed network eLPM or LPM timer value can be stored in memory 516 (e.g., as PSM parameter information 524).

The retry tracking component 520 can further be configured to reset the counts for N and/or M to default values (e.g., zero) in response to a UE reset, power recycle, re-boot, enter/exit airplane mode, and the like. In some implementations, the core wireless communication network can also reset the counts for N and/or M to their default values or another value (e.g., using an OTA message). For example, in one implementation, the network may determine that the UE should forgo any possible remaining PSM parameter negotiation attempts allowed and begin only using the network PSM parameter values. According to this implementation, the network can send the UE an OTA message that causes the UE to increase N and M to be greater than the N-max and the M-max value, respectively, or to set the N-max and the M-max values to values that are lower than the current N and M values, respectively.

In some implementations, the network can also provide the UE with new network PSM parameter values. For example, the network may respond to a UE attach or TAU request comprising network PSM parameters with an attach/TAU acceptance message with new network PSM parameters. According to this implementation, as defined in the 3GGP Release 12 specification, the UE is to honor the new network PSM parameters included in the attach/TAU response. Accordingly, the UE will operate in IM and LPM according to the new network PSM parameters. In addition, the retry tracking component 520 can include information in the PSM parameter information 524 identifying the new network PSM parameters. In the next attach/TAU request, the PSM parameter control component 522 can direct the UE to employ the new network PSM parameters if N is greater than or equal to N-max and/or M is greater than or equal to M-max.

Figure 6:
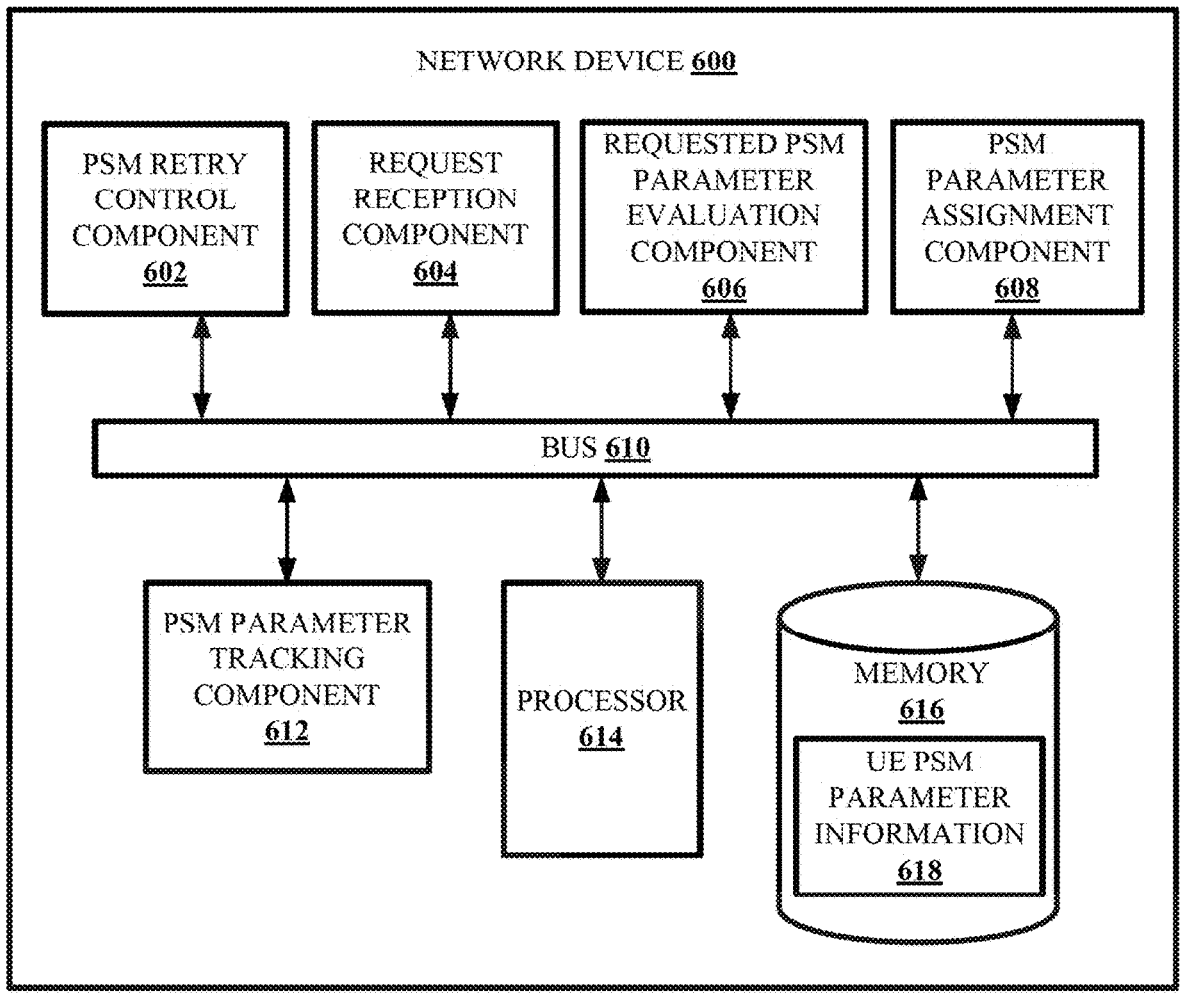
FIG. 6 presents an example network device configured to facilitate managing negotiation of PSM parameters between a UE the network device in accordance with various aspects and embodiments of the subject disclosure.

FIG. 6 presents an example network device 600 configured to facilitate managing negotiation of PSM parameters between a UE the network device in accordance with various aspects and embodiments of the subject disclosure. In various embodiments, a network device of the one or more network devices 108 of system 100 can be or include network device 600, or vice versa. In one implementation, the network device 600 is an MME device. Still in other embodiments, one or more components of the network device 600 can be included at the network node (e.g., network node) that connects a UE to the core wireless communication network (e.g., core wireless communication network 106). Repetitive description of like elements employed in respective embodiments is omitted for sake of brevity.

The network device 600 can include various components that facilitate managing negotiation of PSM parameters between the network device 600 and a UE (e.g., UE 102, UE 500 and the like). These components can include PSM retry control component 602, request reception component 604, requested PSM parameter evaluation component 606, PSM parameter assignment component 608 and PSM parameter tracking component 612. The network device 600 can include memory to store computer executable components and instructions (e.g., the PSM retry control component 602, the request reception component 604, the requested PSM parameter evaluation component 606, the PSM parameter assignment component 608, and the PSM parameter tracking component 612). The network device 600 can also include a processor 614 to facilitate operation of the computer executable instructions (e.g., the computer executable components and instructions) by the network device 600. The network device 600 can further include a device bus 610 that couples the various components of the network device, including, but not limited to: the PSM retry control component 602, the request reception component 604, the requested PSM parameter evaluation component 606, the PSM parameter assignment component 608, and the PSM parameter tracking component 612, the memory 616 and the processor 614. Examples of said processor 614 and memory 616, as well as other suitable computer or computing-based elements that can be employed by the network device 600, can be found with reference to FIG. 11.

In one or more embodiments, the PSM retry control component 602 can be configured to control various aspects of the PSM retry control protocol deployed at respective UEs (e.g., on the UE SIM/UICC) serviced by the wireless communication network associated with the network device 600. For example, in some implementations, the PSM retry control component 602 can control activating/enabling and deactivating/disabling the PSM retry protocol functionality at respective UEs. In embodiments in which the PSM retry control protocol functionality is provided on the SIM card or UICC of the UE, the PSM retry control component 602 can direct the network device 600 to send the UE an OTA message that either activates or deactivates the retry control functionality at the UE (e.g., the PSM retry component 518). For example, the OTA message can direct the UE either to set an PSM retry control flag value to zero or one, thereby disabling or enabling the PSM retry component 518. The PSM retry control component 602 can also control the threshold values N-max and/or M-max employed by the UE PSM retry component (e.g., PSM retry component 518). For example, in embodiments in which the PSM retry control protocol functionality is provided on the SIM card or UICC of the UE, the PSM retry control component 602 can direct the network device 600 to send the UE an OTA message that defines the N-max value and/or the M-max value for application by the PSM retry component (e.g., PSM retry component 518). In some embodiments, the PSM retry control component 602 can also control resetting N and/or M back to their default values (e.g., zero) or another value.

The request reception component 604 can be configured to receive attach and TAU requests sent by a UE. In response to a determination that an attach or TAU request comprises PSM parameter values and thus includes a request to enter PSM by the UE, the request reception component 604 can forward the request to the requested PSM parameter evaluation component 606. The requested PSM parameter evaluation component 606 can be configured to evaluate PSM parameters included in a UE attach or TAU request to determine whether to authorize performance of PSM by the UE. Based on a determination that the UE is authorized to operate in PSM, the requested PSM parameter evaluation component 606 can further be configured to determine what PSM parameter values the UE can apply. For example, the PSM parameter evaluation component 606 can determine a value for the active timer (T3324) and a value for the LPM timer (e.g., eT3412 or T3412).

In accordance with one or more embodiments, the network device 600 can store UE PSM parameter information 618 in memory 616 to facilitate determining what PSM parameters the UE can apply. For example, the UE PSM parameter information can include a look-up table that identifies UEs service by the network device 600. The look-up table can also include information that identifies network PSM parameters that the network has previously determined the UE should apply when operating in PSM, including an active timer value (e.g., T3324) and a LPM timer value (e.g., eT3412 or T3412). For example, in response to reception of an attach or TAU request from a UE including PSM parameter values, the requested PSM parameter evaluation component 606 can be configured to examine the UE PSM parameter information 618 to determine whether the UE is included in the look-up table and whether the UE is associated with network PSM parameter information.

In implementations in which the UE is included in the look-up table and is associated with network PSM parameter information, the requested PSM parameter evaluation component 606 can compare the requested UE PSM parameter value(s) for the active timer (T3324) and the LPM timer (eT3412) with the network PSM parameter values for the active timer and the LPM timer (e.g., either eT3412 or T3412) associated with the UE. In response to a determination that the requested UE PSM parameter values and the network PSM parameter values are the same, the requested PSM parameter evaluation component 606 can direct the PSM parameter assignment component 608 to send the UE an attach or TAU acceptance message including the network PSM parameter values. However, in response to a determination that the requested UE PSM parameter values and the network PSM parameter values are different, the requested PSM parameter evaluation component 606 can be configured to perform an evaluation process to determine whether to authorize the UE to employ the requested UE PSM parameter values. For example, the requested PSM parameter evaluation component 606 determine whether application of the UE PSM parameter values by the UE is suitable in view of current network load (e.g., or load of the network device 600), current network signal scheduling constraints, and other network related factors.

Based on this evaluation process, in response to a determination by the requested PSM parameter evaluation component 606 that the UE can employ its requested UE PSM parameter values (e.g., for the active timer and/or the LPM timer), the requested PSM parameter evaluation component 606 can direct the PSM parameter assignment component 608 to send the UE an attach or TAU acceptance message including the requested UE PSM parameter values. However, if the requested PSM parameter evaluation component 606 determines that the requested UE PSM parameter values are not appropriate, in one embodiment, the requested PSM parameter evaluation component 606 can direct the PSM parameter assignment component 608 to send the UE an attach or TAU acceptance message including the network PSM parameter values that are defined in the look-up table. In another embodiment, the requested PSM parameter evaluation component 606 can determine new network PSM parameter values that the UE should employ in view of current network conditions. According to this embodiment, the requested PSM parameter evaluation component 606 can direct the PSM parameter assignment component 608 to send the UE an attach or TAU acceptance message including the new network PSM parameter values. The PSM parameter tracking component 612 can further update the look-up table to include the new network PSM parameter values for the UE.

In implementations in which the UE is not included in the look-up table and/or is not associated with network PSM parameter information, the requested PSM parameter evaluation component 606 can be configured to perform the aforementioned evaluation process to determine whether to authorize the UE to use the UE requested PSM parameter values. According to this implementation, based on the evaluation process, in response to a determination that the UE can employ its requested UE PSM parameter values, the requested PSM parameter evaluation component 606 can direct the PSM parameter assignment component 608 to send the UE an attach or TAU acceptance message including the requested UE PSM parameter values. The PSM parameter tracking component 612 can further enter information into the look-up table (e.g., the UE PSM parameter information 618), associating the UE with the assigned PSM parameter values. However, if the requested PSM parameter evaluation component 606 determines that the requested UE PSM parameter values are not appropriate in view of current network conditions, (e.g., based on network load, signal scheduling constraints, etc.), the requested PSM parameter evaluation component 606 can determine network approved PSM parameter values that the UE should employ in view of current network conditions. The requested PSM parameter evaluation component 606 can then direct the PSM parameter assignment component 608 to send the UE an attach or TAU acceptance message including the network determined PSM parameter values. The PSM parameter tracking component 612 can further update the look-up table to include information associating the UE with the network determined PSM parameter values.

With the subject configuration, if a UE provides the network device 600 with PSM parameter values (e.g., for T3324 and/or eT3412 or T3412) that are the same as those associated with the UE in the UE PSM parameter information 618 (e.g., the UE provides network PSM parameter values as opposed to UE preferred PSM parameter values), the requested PSM parameter evaluation component 606 does not need to perform an evaluation process to determine whether to authorize the UE requested PSM parameter values. The PSM parameter assignment component 608 can simply respond to the attach or TAU request with the same parameters requested by the UE. In one or more additional embodiments, in these scenarios, rather than always responding to the UE with the previously approved network PSM parameters, the requested PSM parameter evaluation component 606 can be configured to periodically re-evaluate the network PSM parameters requested by the UE.

For example, in one embodiment, the requested PSM parameter evaluation component 606 can be configured to re-evaluate the network PSM parameters requested by the UE according to a predetermined schedule (e.g., once a day, once a week, etc.). In another example, the requested PSM evaluation component 606 can be configured to re-evaluate the network PSM parameters requested by the UE in response to a change in network conditions, such as change in network load relative to a threshold degree of deviation. In another example, the PSM parameter tracking component 612 can be configured to track the number of times P a UE includes network PSM parameters in an attach or TAU request, thereby causing the PSM parameter assignment component 608 to automatically respond to the request by including the network PSM parameters in the attach or TAU response. According to this example, the requested PSM evaluation component 606 can employ a threshold number (P-max) that limits the number of times the PSM parameter assignment component 608 can automatically respond with the network PSM parameter values before re-evaluating the network PSM parameter values. For example, in association with reception of an ATTACH or TAU request from a UE including network PSM parameter values, if P is greater than P-max, the requested PSM parameter evaluation component 606 can be configured to re-evaluate the network PSM parameters requested by the UE. According to this example, the requested PSM parameter evaluation component 606 may determine new network PSM parameter values for the UE, update the look-up table with the new network PSM parameter values, and direct the PSM parameter assignment component 608 to send the UE and attach or TAU response with the new network PSM parameter values.

Figure 7:
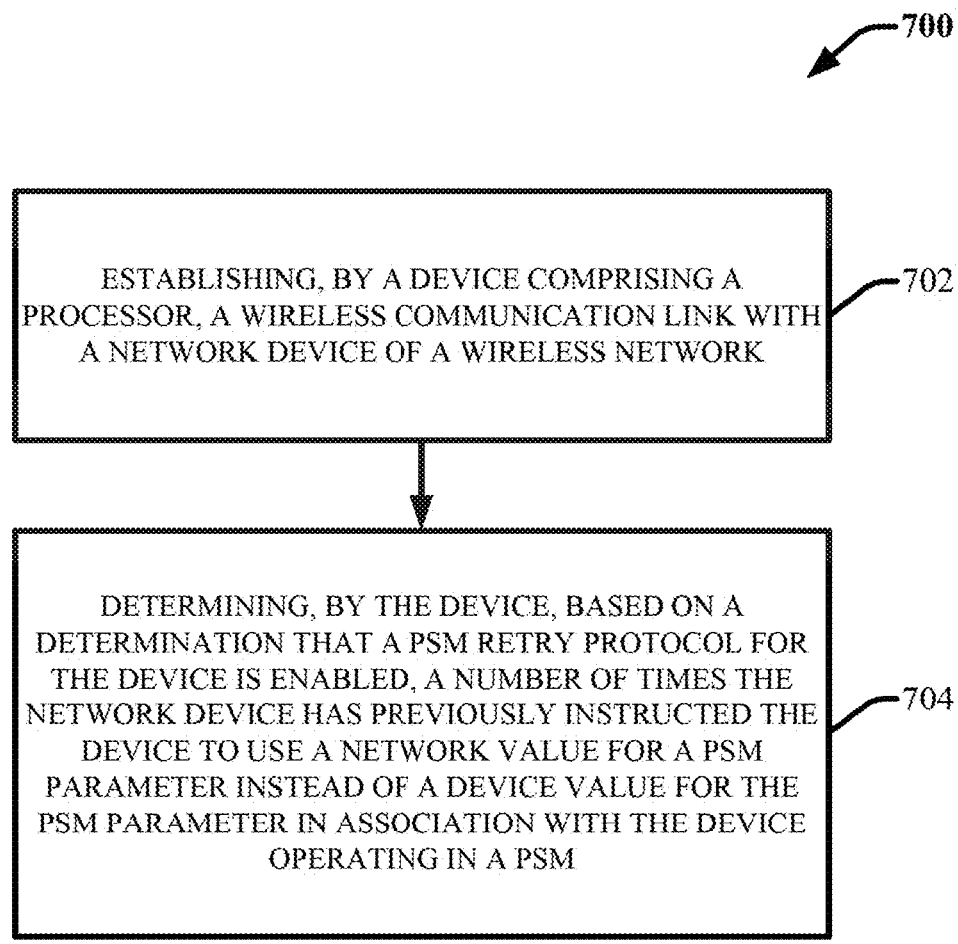
FIG. 7 illustrates another example method for managing negotiation of PSM parameters between a UE and core network device in accordance with various aspects and embodiments of the subject disclosure.
Figure 8:
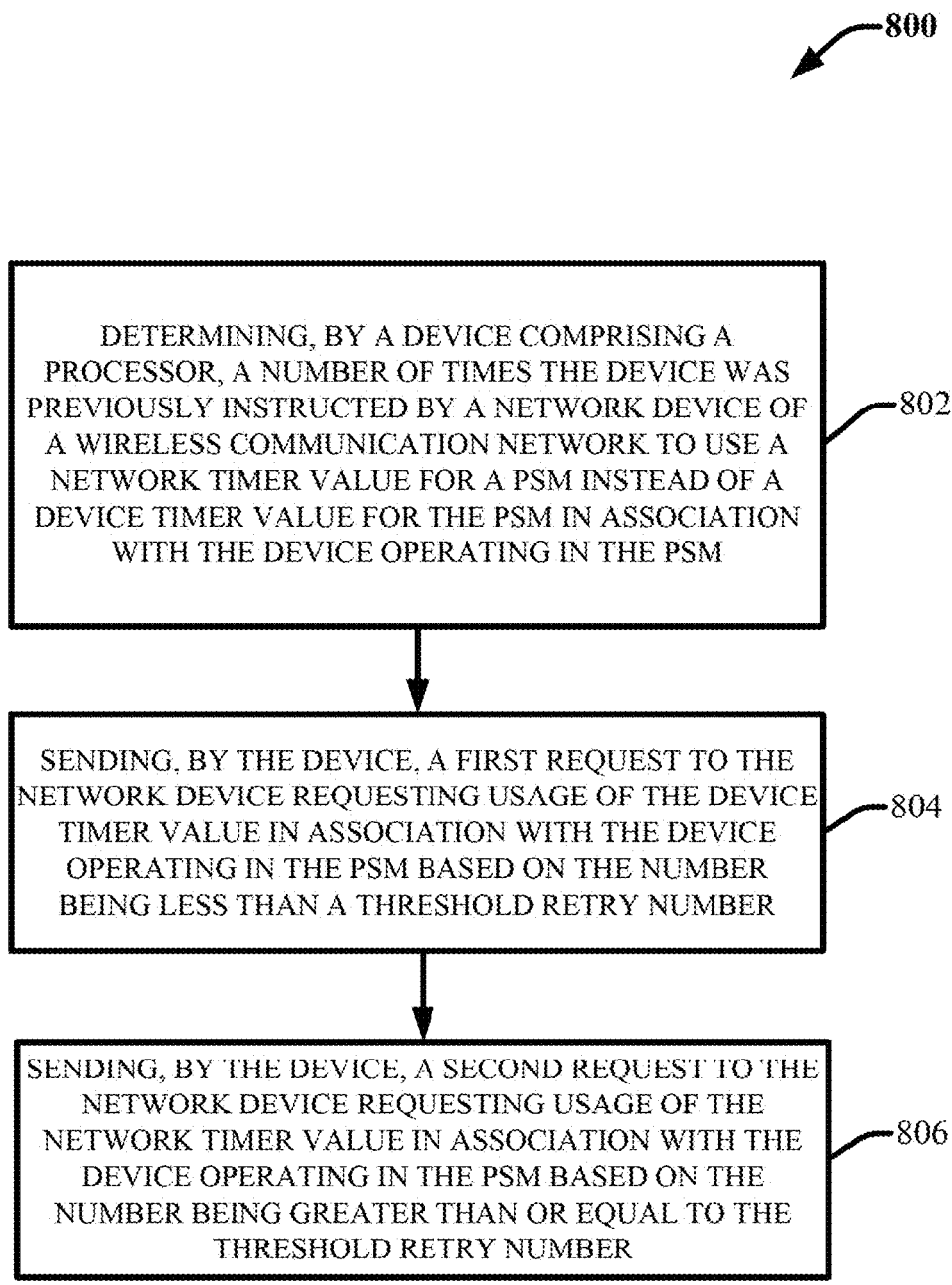
FIG. 8 illustrates another example method for managing negotiation of PSM parameters between a UE and core network device in accordance with various aspects and embodiments of the subject disclosure.
Figure 9:
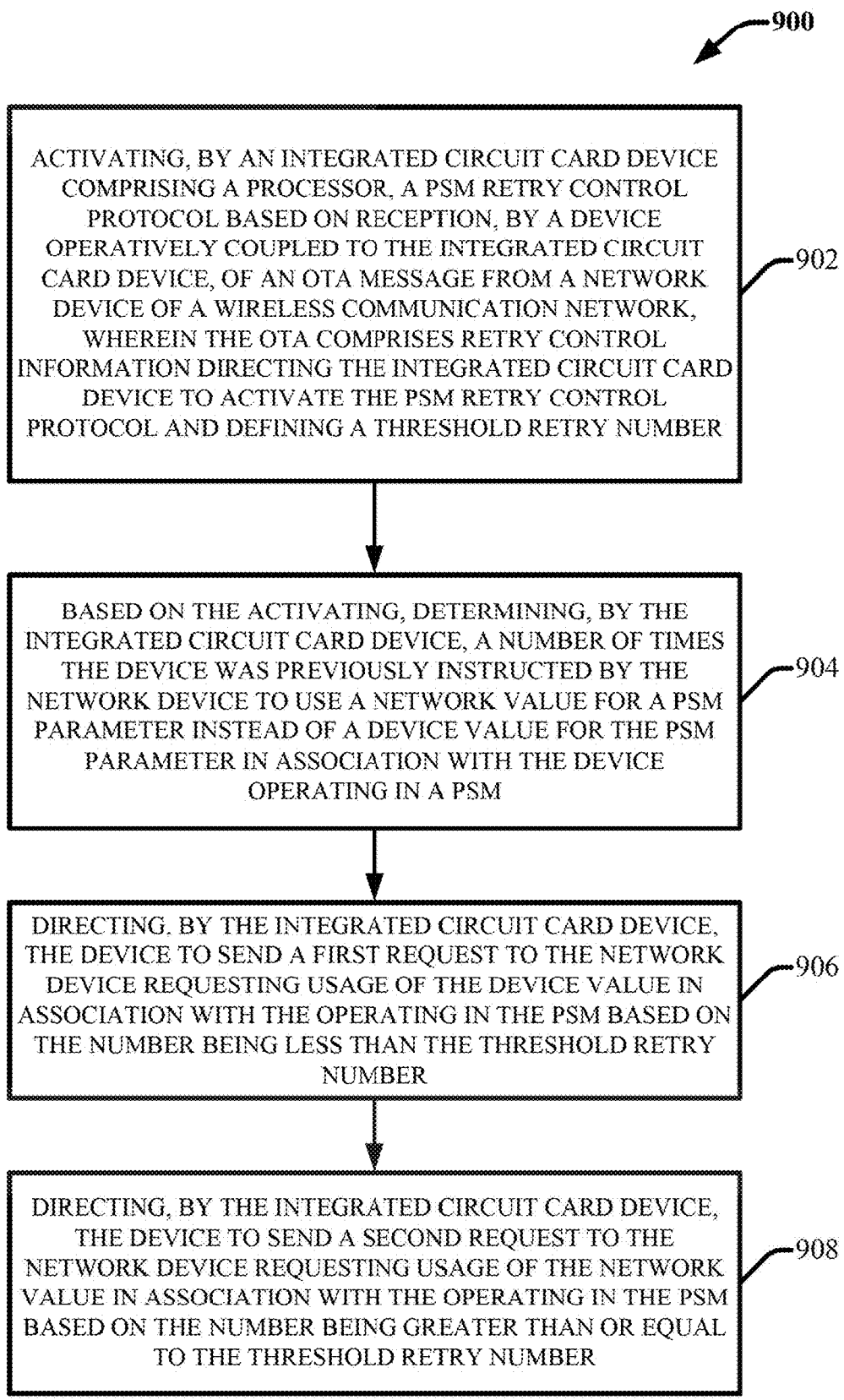
FIG. 9 illustrates another example method for managing negotiation of PSM parameters between a UE and core network device in accordance with various aspects and embodiments of the subject disclosure.

In view of the example system(s) described above, example method(s) that can be implemented in accordance with the disclosed subject matter can be better appreciated with reference to flowcharts in FIGS. 7-9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates another example method 700 for managing negotiation of PSM parameters between a UE and core network device in accordance with various aspects and embodiments of the subject disclosure. Repetitive description of like elements employed in respective embodiments is omitted for sake of brevity.

At 702, a device comprising a processor (e.g., a UE 102, UE 500 or the like), establishes a wireless communication link with a network device of a wireless network. For example, the UE can connect to a core network device (e.g., a network device 108, 600 or the like), via a network node of the wireless communication network in association with performing an attachment procedure or a TAU procedure. At 704, the device determines, based on a determination that a PSM retry protocol for the device is enabled (e.g., based on enablement of PSM retry component 518), a number of times (N and/or M) the network device has previously instructed the device to use a network value for a PSM parameter instead of a device value for the PSM parameter in association with the device operating in a PSM. For example, the UE can determine a number of times (N) the network device has previously instructed the UE to employ a network active timer (T3324) value as opposed to a UE preferred active timer value. In another example, the UE can determine a number of times (M) the network device has previously instructed the UE to employ a network LPM timer (e.g., T3412 or eT3412) as opposed to a UE preferred LPM timer value (e.g., for eT3412). In one implementation, if N is less than N-max, the UE can request usage or the UE preferred IM timer in the attachment or TAU request. Otherwise, the UE can be configured to include the previously received network IM timer value attachment o TAU request. Similarly, if M is less than M-max, the UE can request usage or the UE preferred PSM timer in the attachment or TAU request. Otherwise, the UE can be configured to include the previously received network PSM timer value attachment o TAU request.

FIG. 8 illustrates another example method 800 for managing negotiation of PSM parameters between a UE and core network device in accordance with various aspects and embodiments of the subject disclosure. Repetitive description of like elements employed in respective embodiments is omitted for sake of brevity.

At 802, a device comprising a processor (e.g., a UE 102, UE 500 or the like), determines a number of times (M) the device was previously instructed by a network device (e.g., a network device 108, network device 600 and the like) of a wireless communication network to use a network timer value for a PSM instead of a device timer value for the PSM in association with the device operating in the PSM. At 804, the device sends a first request to the network device requesting usage of the device timer value in association with the device operating in the PSM based on the number being less than a threshold retry number (M-max). At 806, the device sends a second request to the network device requesting usage of the network timer value in association with the device operating in the PSM based on the number being greater than or equal to the threshold retry number.

FIG. 9 illustrates another example method 900 for managing negotiation of PSM parameters between a UE and core network device in accordance with various aspects and embodiments of the subject disclosure. Repetitive description of like elements employed in respective embodiments is omitted for sake of brevity.

At 902, an integrated circuit card device comprising a processor (e.g., IC card 514), activates a PSM retry control protocol based on reception, by a device operatively coupled to the integrated circuit card device (e.g., UE 500), of an OTA message from a network device (e.g., network device 108, 600 and the like) of a wireless communication network, wherein the over the air message comprises retry control information directing the integrated circuit card device to activate the PSM retry control protocol and defining a threshold retry number (N-max and/or M-max). At 904, based on the activating, the integrated circuit card device determines a number of times (N and/or M) the device was previously instructed by a network device of a wireless communication network to use a network value for a PSM parameter instead of a device value for the PSM parameter in association with the device operating in a PSM. At 906, the integrated circuit card device directs the device to send a first request to the network device requesting usage of the device value in association with the operating in the PSM based on the number being less than the threshold retry number. At 908, the integrated circuit card device directs the device to send a second request to the network device requesting usage of the network value in association with the operating in the PSM based on the number being greater than or equal to the threshold retry number.

Figure 10:
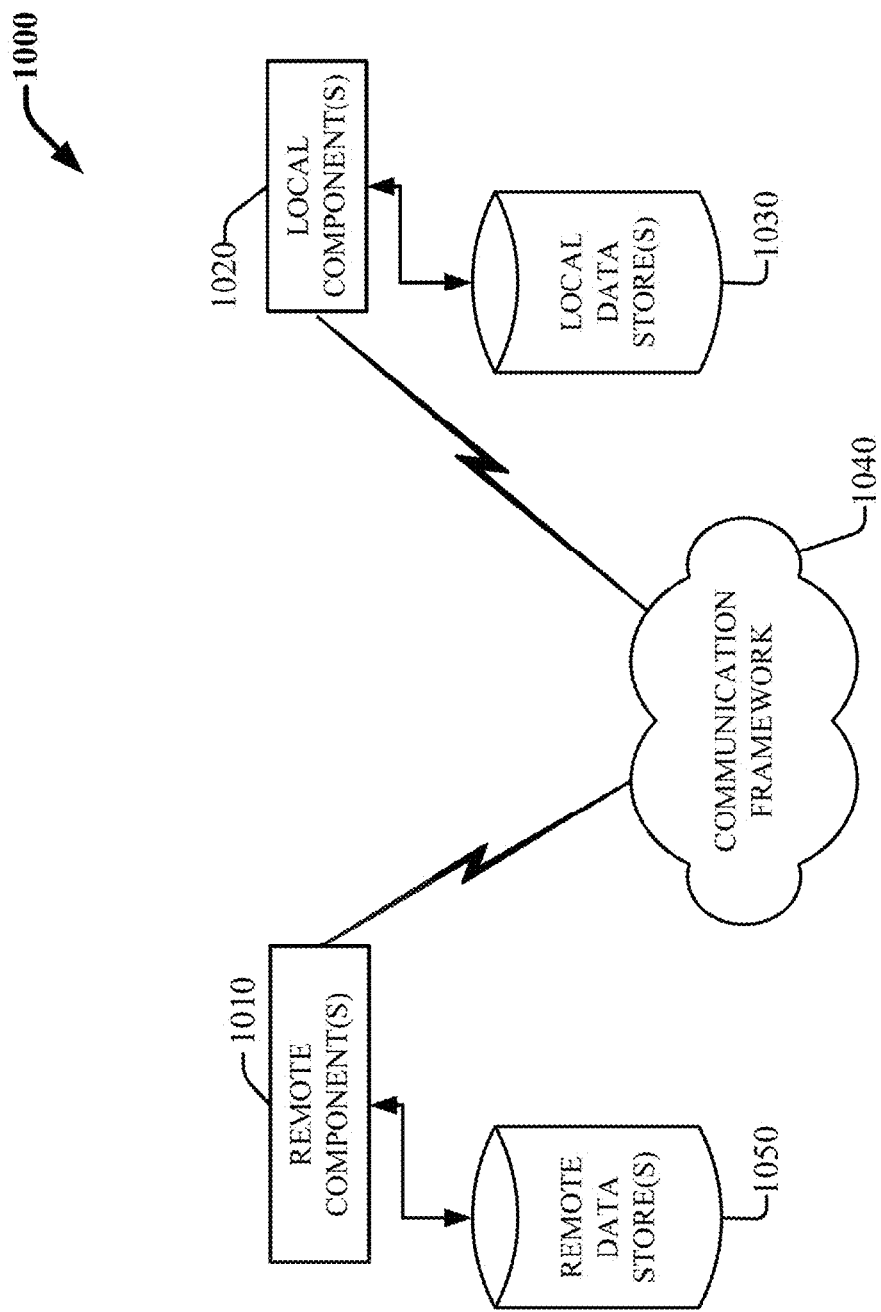
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can comprise servers, personal servers, wireless telecommunication network devices, RAN device(s), etc. As an example, remote component(s) 1010 can be network node 104, network devices 108, network device 600 and the like. The system 1000 also comprises one or more local component(s) 1020. The local component(s) 1020 can be hardware and/or software (e.g., threads, processes, computing devices). In some embodiments, local component(s) 1020 can comprise, for example, UE 102, UE 500, and the like.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via an LTE network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
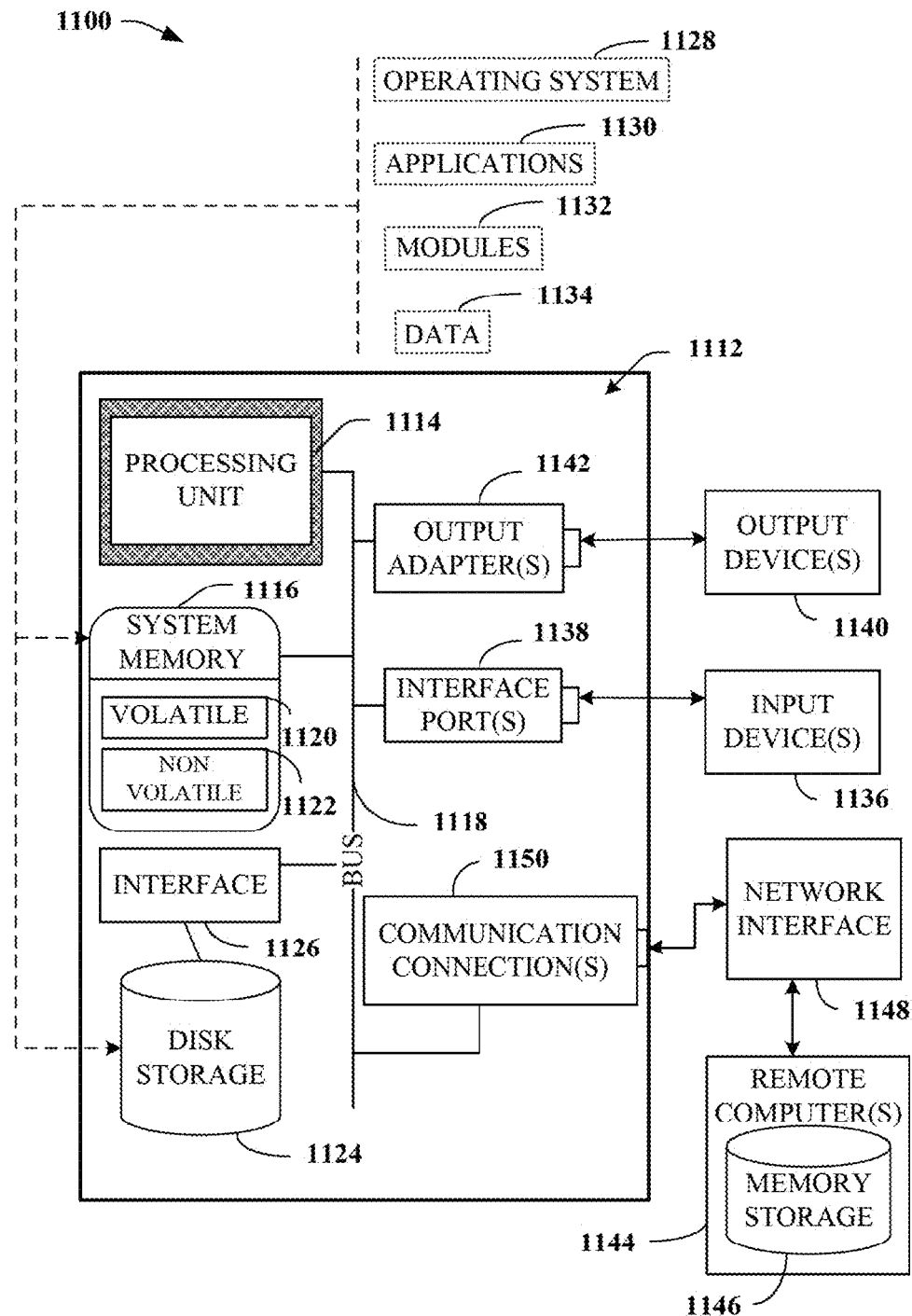
FIG. 11 illustrates an example block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, a UE (e.g., UE 102 and 500), a network node (e.g., network node 104), a core network device (e.g., network device 108, network device 600 and the like) comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 11104), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alterative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial bus port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an on demand basis to enable access to a shared pool of configurable computing resources that can be provisioned and released readily. Cloud computing and storage solutions can store and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
controlling, by a network device of a communication network, a retry control functionality of a device that receives a network service via the communication network, wherein the controlling comprises limiting a number of times the device is able to request usage of a device value for a parameter of a power saving mode after having been previously instructed by the network device to use a network value for the parameter, wherein the network device is operatively coupled to a processor,
wherein the controlling further comprises:
determining, by the network device, a retry threshold value based on a current network condition of the communication network;
setting, by the network device, the retry threshold value on a subscriber identity module card of the device, wherein the retry threshold value limits the number of times the device is able to request the usage of the device value for the parameter of the power saving mode after having been previously instructed by the network device to use the network value for the parameter; and
sending, by the network device, a control message directing the device to enable the retry control functionality by applying the retry threshold value.

2. The method of claim 1, wherein the parameter comprises a duration of an idle mode of the power saving mode.

3. The method of claim 1, wherein the parameter comprises a duration of a low power mode of the power saving mode.

4. The method of claim 1, wherein the parameter comprises an active timer for the power saving mode.

5. The method of claim 1, wherein the sending comprises sending the control message as an over the air message.

6. The method of claim 1, wherein the current network condition comprises a current load of the network device.

7. The method of claim 1, wherein the current network condition comprises a current signal scheduling constraint of the network device.

8. A system, comprising:
a processor of a network device; and
a memory that stores executable instructions that, when executed by the processor, facilitate performance of operations, the operations comprising:
determining to control a retry control functionality of a device in association with operation of the device using a communication network; and
based on the determining, controlling the retry control functionality of the device in association with operation of the device using the communication network, wherein the controlling comprises limiting a number of times the device is able to request usage of a device value for a parameter of a power saving mode after having been previously instructed by the network device of the communication network to use a network value for the parameter,
wherein the controlling further comprises:
determining a retry threshold value based on a current network condition of the communication network;
setting the retry threshold value on a subscriber identity module card of the device, wherein the retry threshold value limits the number of times the device is able to request the usage of the device value for the parameter of the power saving mode after having been previously instructed by the network device to use the network value for the parameter; and sending a control message directing the device to enable the retry control functionality by applying the retry threshold value.

9. The system of claim 8, wherein the parameter comprises a duration of an idle mode of the power saving mode.

10. The system of claim 8, wherein the parameter comprises a duration of a low power mode of the power saving mode.

11. The system of claim 8, wherein the parameter comprises an active timer for the power saving mode.

12. The system of claim 8, wherein the current network condition comprises a current load of the network device.

13. The system of claim 8, wherein the current network condition comprises a current signal scheduling constraint of the network device.

14. The system of claim 8, wherein the sending comprises sending the control message as an over the air message.

15. A non-transitory machine-readable storage medium, comprising executable instructions that, when executed by a processor of a network device, facilitate performance of operations, the operations comprising:

controlling a retry control functionality of a device in association with operation of the device using a communication network, wherein the controlling comprises limiting a number of times the device is capable of requesting usage of a device value for a parameter of the power saving mode after having been previously instructed, by the network device of the communication network, to use a network value for the parameter, wherein the controlling further comprises:

determining a retry threshold value based on a current network condition of the communication network;

setting the retry threshold value on a subscriber identity module card of the device, wherein the retry threshold value limits the number of times the device is able to request the usage of the device value for the parameter of the power saving mode after having been previously instructed by the network device to use the network value for the parameter; and sending a control message directing the device to enable the retry control functionality by applying the retry threshold value.

16. The non-transitory computer machine-readable storage medium of claim 15, wherein the parameter comprises a duration of an idle mode of the power saving mode.

17. The non-transitory computer machine-readable storage medium of claim 15, wherein the parameter comprises a duration of a low power mode of the power saving mode.

18. The non-transitory computer machine-readable storage medium of claim 15, wherein the parameter comprises an active timer for the power saving mode.

19. The non-transitory computer machine-readable storage medium of claim 15, wherein the sending comprises sending the control message as an over the air message.

20. The non-transitory computer machine-readable storage medium of claim 15, wherein the current network condition comprises a current load of the network device.

* * * * *